May 3, 1955        K. G. ÅHLÉN        2,707,408
HYDRAULIC TRANSMISSION

Filed June 18, 1949        11 Sheets-Sheet 1

INVENTOR
Karl Gustav Ahlén
ATTORNEY

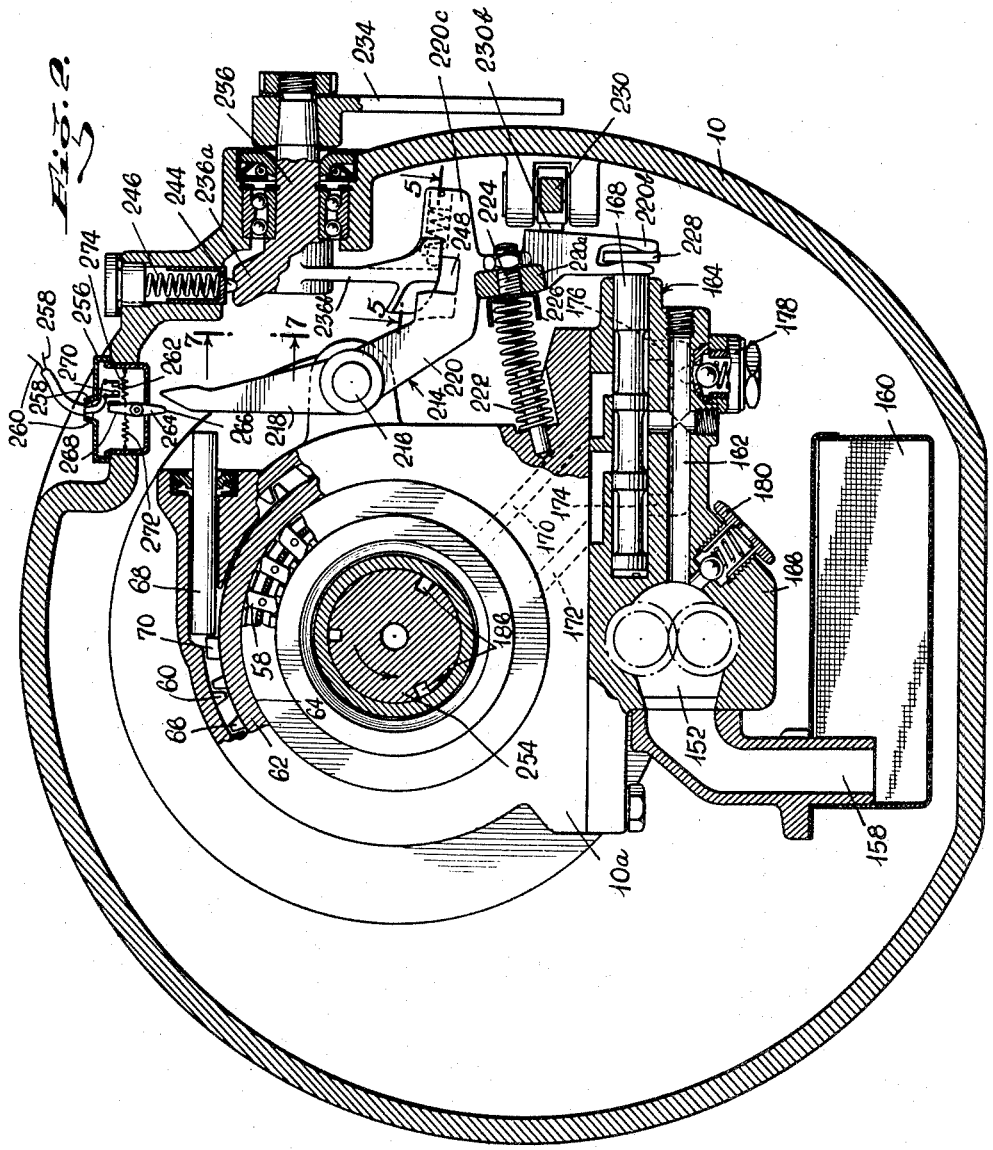

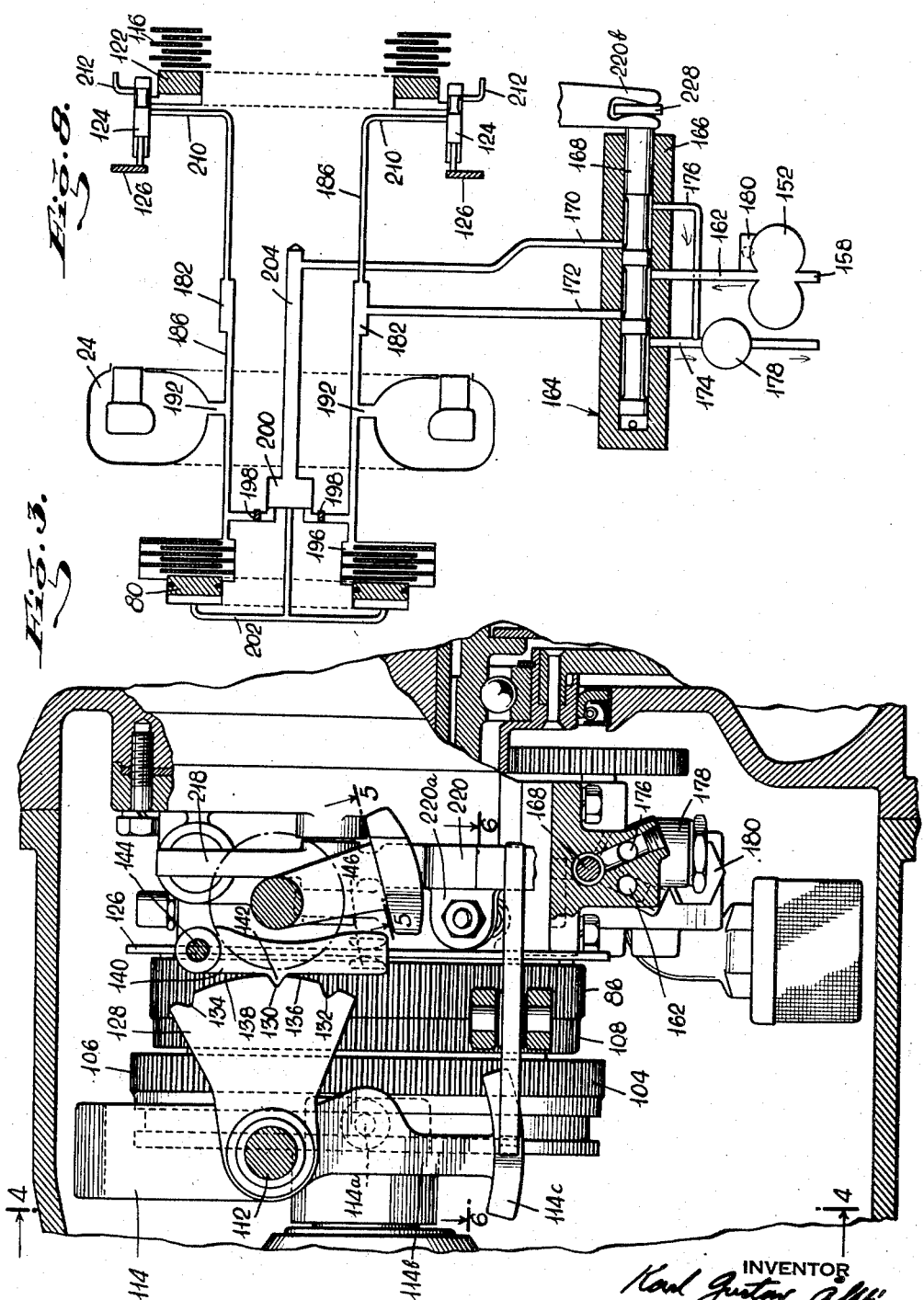

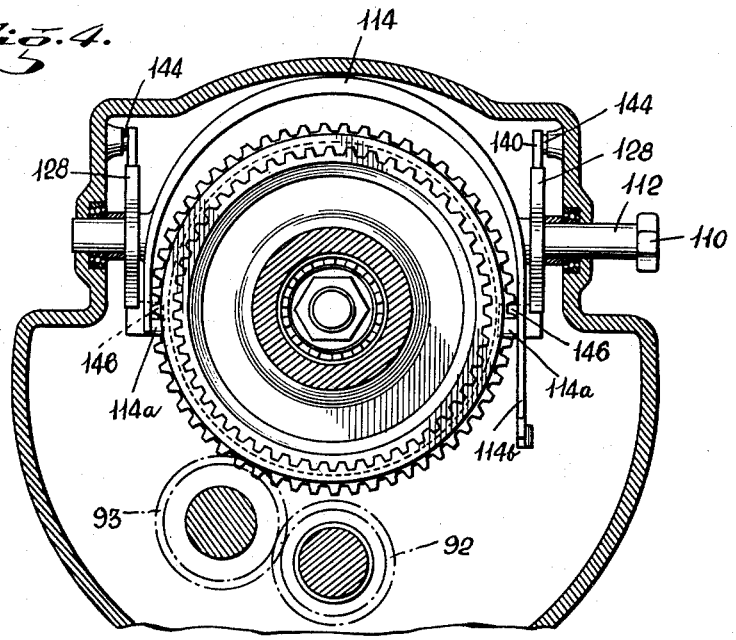
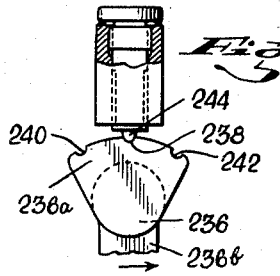
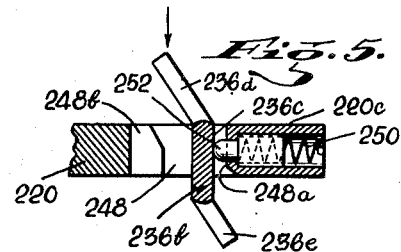
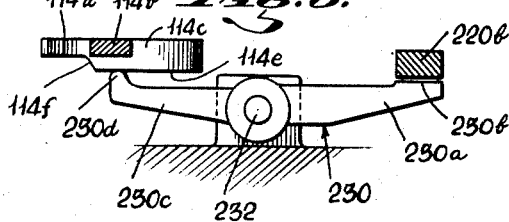

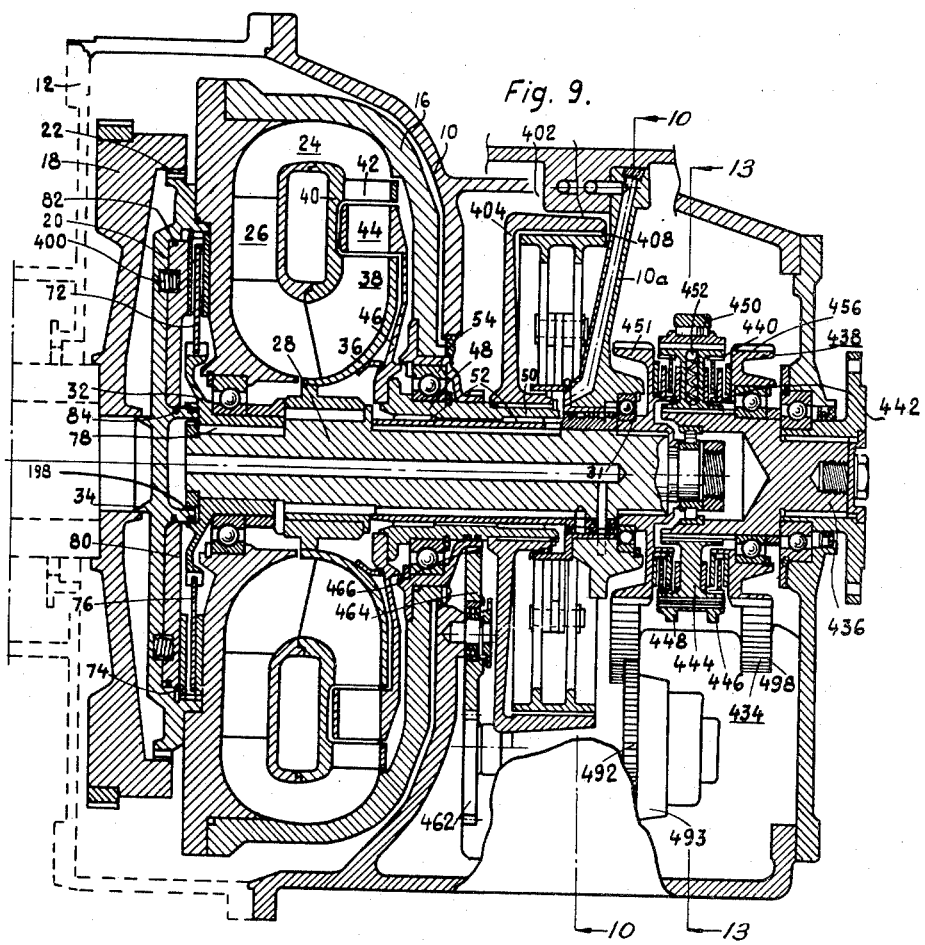

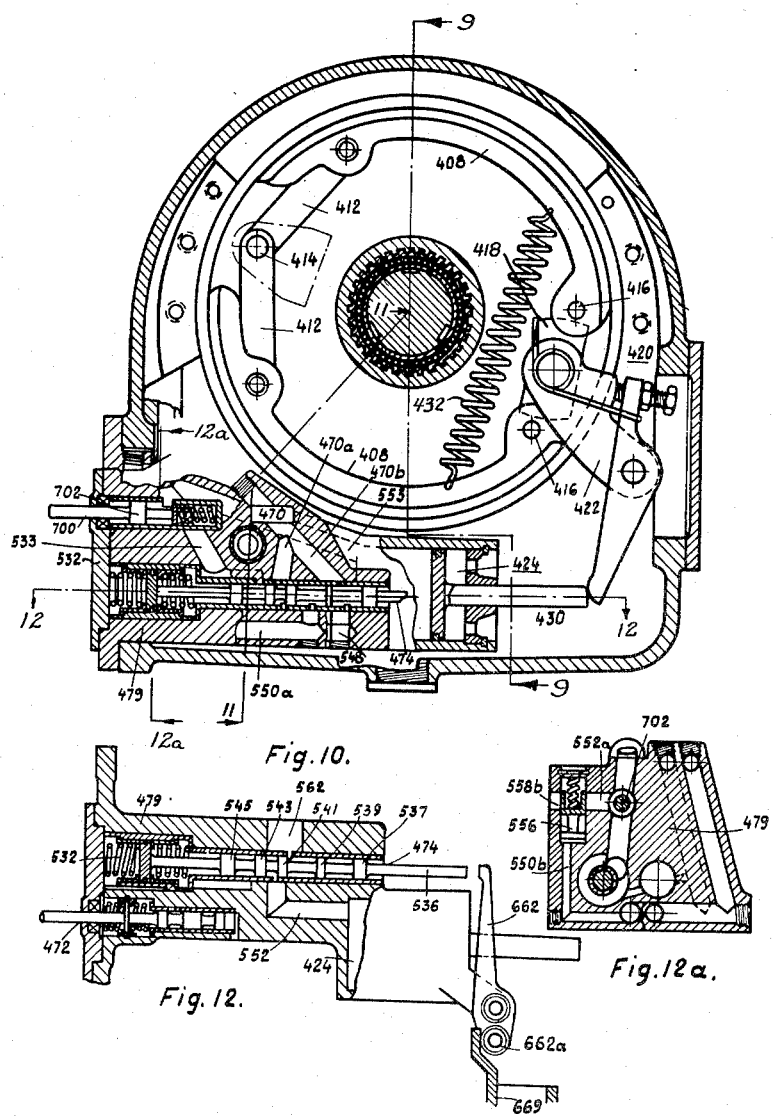

Vehicle speed

INVENTOR.
Karl Gustav Ahlén
BY
his ATTORNEY

May 3, 1955
K. G. ÅHLÉN
2,707,408
HYDRAULIC TRANSMISSION
Filed June 18, 1949
11 Sheets-Sheet 8
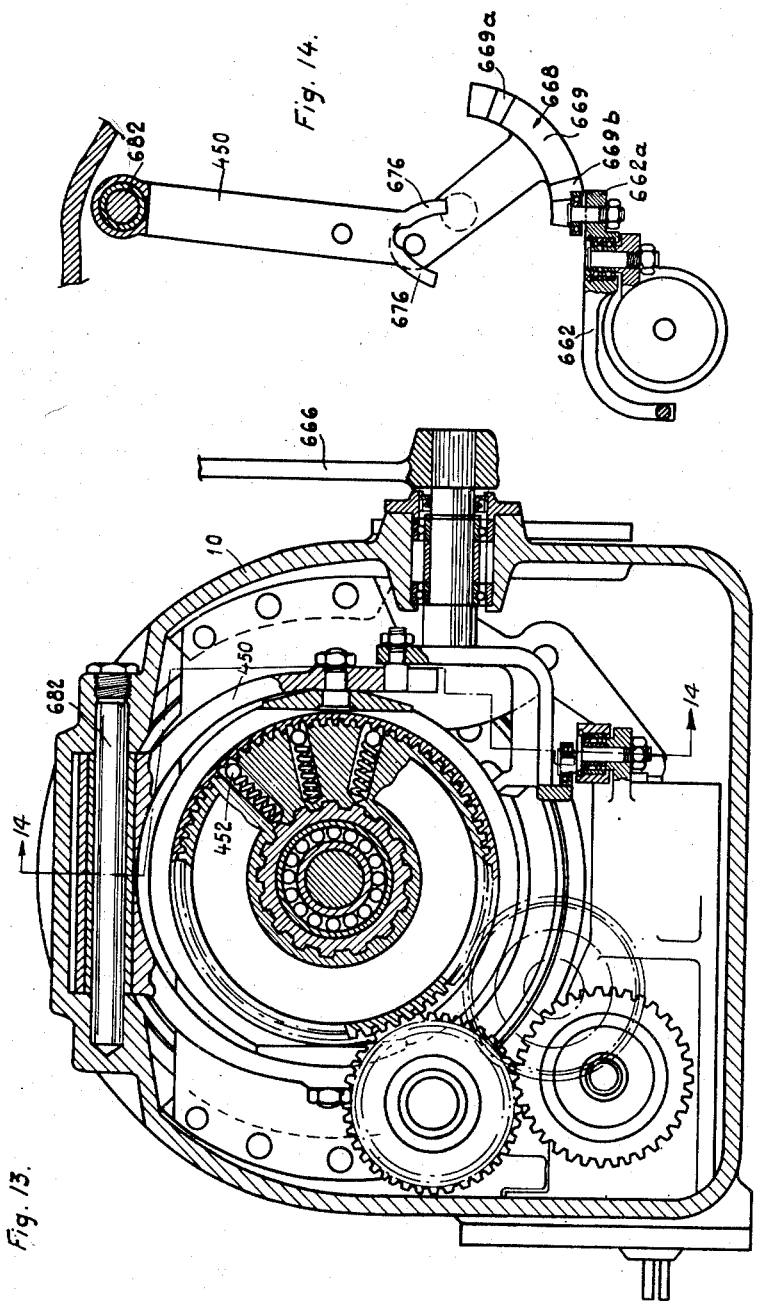

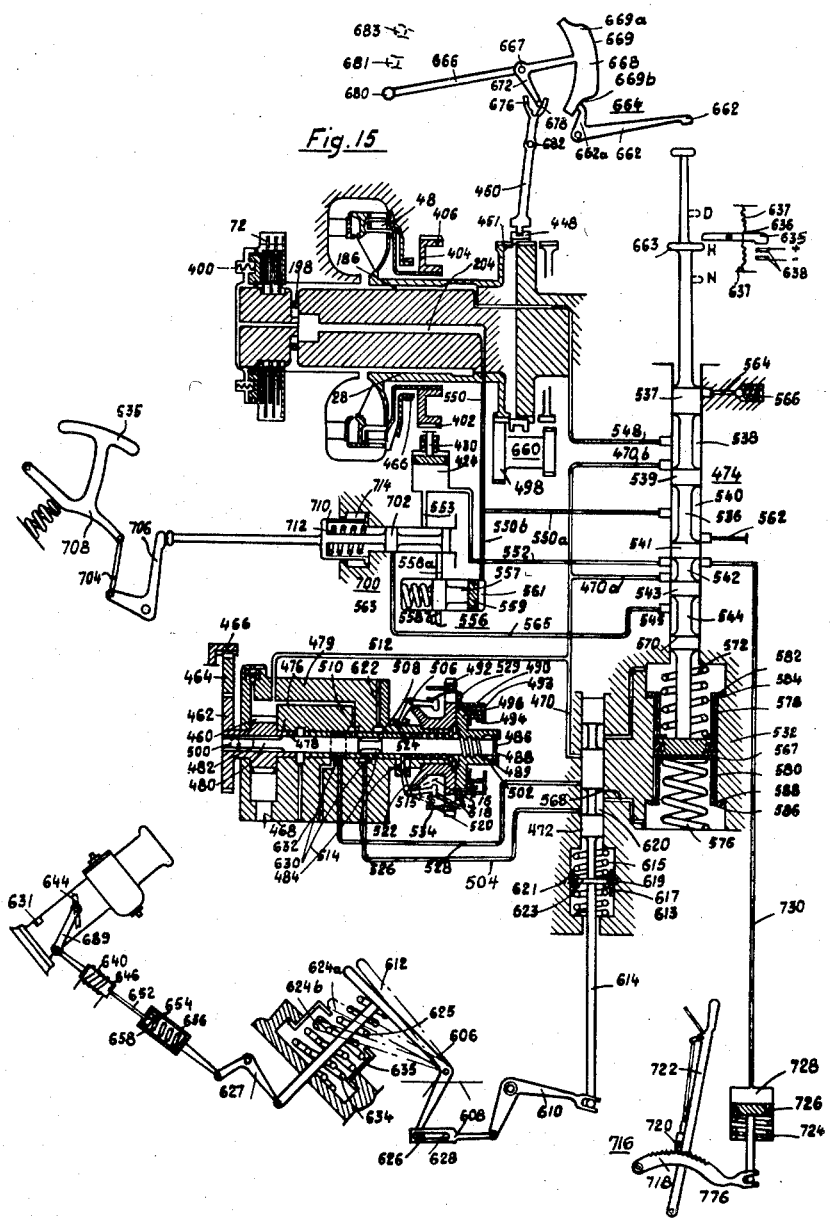

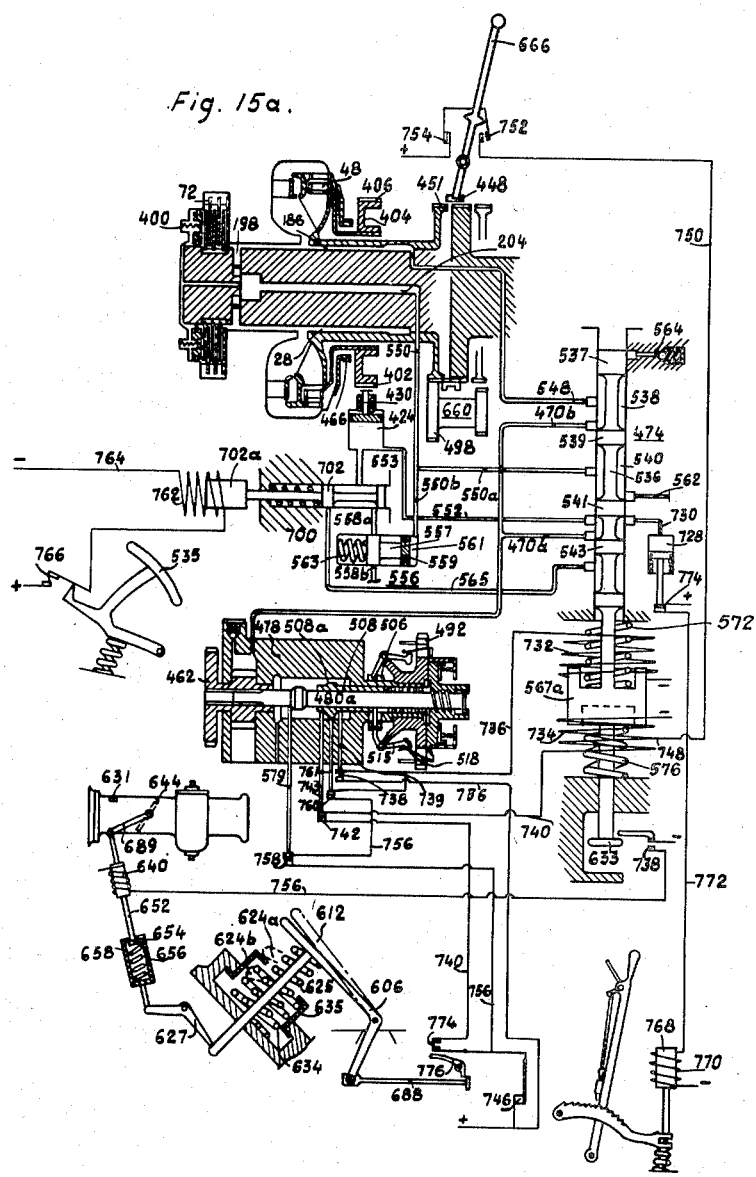

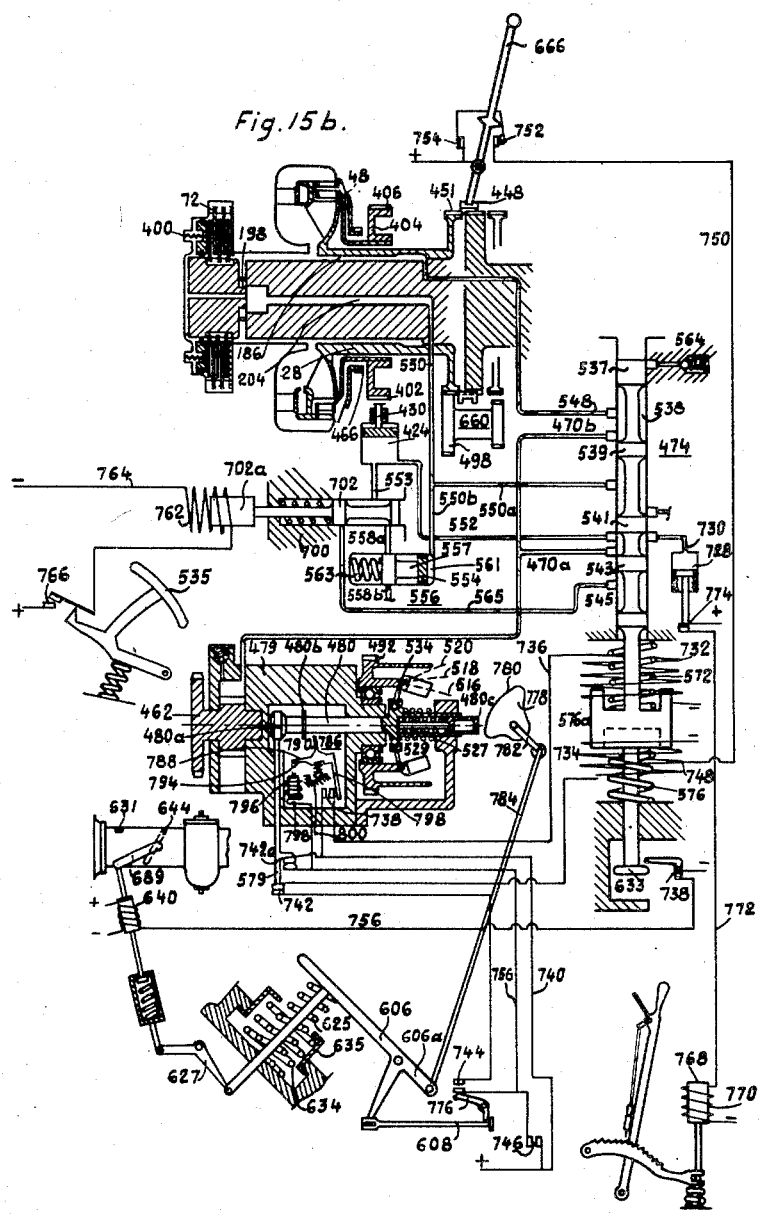

United States Patent Office 2,707,408
Patented May 3, 1955

2,707,408

HYDRAULIC TRANSMISSION

Karl G. Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application June 18, 1949, Serial No. 100,041

Claims priority, application Sweden January 20, 1949

49 Claims. (Cl. 74—645)

This application is a continuation-in-part with respect to my co-pending application Serial No. 40,076, filed July 22, 1948, now Patent No. 2,676,497, dated April 27, 1954, and relates back thereto as to all common subject matter.

The present invention relates to hydraulic power transmissions and has particular reference to such transmissions in which the hydraulic drive embodies a variable speed torque converter for producing an increase in the torque applied to the driven or output element as compared with torque delivered by the engine or other source of power to the input element of the transmission, and in which the torque converting hydraulic drive is employed in the transmission in conjunction with an alternative drive providing a relatively fixed speed ratio between the input and output members of the transmission and which is adapted to be used in alternation with the variable speed torque converting hydraulic drive. More specifically the invention relates to transmissions of the above general character in which the hydraulic torque converting drive is incorporated in the transmission with a positive mechanical drive to be used in alternation and providing a direct drive connection between the driving and driven members of the transmission.

Among the several objects of the invention are: to provide a transmission of the character under consideration in which shifting of the drive from hydraulic to the alternative or vice versa, may be effected automatically in response to certain predetermined conditions of operation; in which such automatic shift is subject to an overruling manual control which will permit the shift from one type of drive to the other to be made at the will of the operator when the circumstances are such that such shift does not result in improper or inefficient operation of the transmission under the existing circumstances; in which a neutral position is provided from which shift can be made to forward or reverse drive and in which such shift is subject to an automatic control operative to give a reduced torque transmitted through the converter during the shifting operation; in which the torque converter is combined with an alternative mechanical drive and clutch mechanism automatically operative to connect the alternative drive when power is not being delivered to the transmission, and automatically operative to release the alternative drive when power is first applied after a period of inactivity, whereby to enable positive drive to be transmitted from the vehicle wheels to the motor of the vehicle for starting purposes as required and also to utilize the motor as a parking brake if desired, in which the reaction part of the torque converter may be used as a hydraulic braking means for augmenting the braking effect of the engine; to provide improved means whereby such automatic and manual control may be effected without deviation from the normal operating habits of the operator of a vehicle in which the apparatus is installed; to provide improved means whereby the required controls are simply and effectively actuated by a pressure fluid system or combined pressure fluid and electrical system which advantageously employs as an operating medium the same fluid that is used for operating the hydraulic torque converting system; to provide an improved organization in which the above noted objects may be accomplished in an organization which is relatively simple mechanically as compared with the many functions accomplished by it and which may be incorporated in a design giving relatively very compact overall dimensions so that the apparatus may readily be installed in the comparatively limited space available in automobiles and like automotive vehicles; and to provide other and more detailed improvements in construction and operating characteristics as will hereinafter more fully appear as this specification proceeds.

In order more fully to understand the nature of the invention, its several objects, and the manner in which they may best be obtained, there is set forth in the ensuing portion of this specification a description of several embodiments of apparatus for carrying the invention into effect, to which reference may be had in conjunction with the accompanying drawings forming a part hereof and in which:

Fig. 2 is a section taken on the line 2—2 of Fig. 1;

Fig. 3 is a fragmentary section on an enlarged scale with certain parts broken away looking from the right of the transmission as viewed in Fig. 2;

Fig. 4 is a section taken on the line 4—4 of Figs. 1 and 3;

Fig. 5 is a section taken on the line 5—5 of Figs. 2 and 3;

Fig. 6 is a section taken on the line 6—6 of Fig. 3;

Fig. 7 is a section taken on the line 7—7 of Fig. 2;

Fig. 8 is a schematic diagram illustrative of the fluid control system of the parts shown in Fig. 1;

Fig. 9 is a view similar to Fig. 1 showing another example of transmission embodying the invention, taken on the line 9—9 of Fig. 10;

Fig. 10 is a section taken on the line 10—10 of Fig. 9;

Fig. 12 is a section taken on the line 12—12 of Fig. 10;

Fig. 12a is a section taken on the line 12a—12a of Fig. 10;

Fig. 13 is a section taken on the line 13—13 of Fig. 9;

Fig. 14 is a section taken on the line 14—14 of Fig. 13;

Fig. 15 is a schematic diagram of the control system embodied in the construction shown in the transmission illustrated in Figs. 9–14;

Fig. 15a is a schematic diagram similar to Fig. 15 showing a different example of control system applicable to the transmission shown in Fig. 9 and related figures;

Fig. 15b is a schematic diagram showing still another form of control system applicable to the transmission shown in Fig. 9 and related figures.

Figure 1:
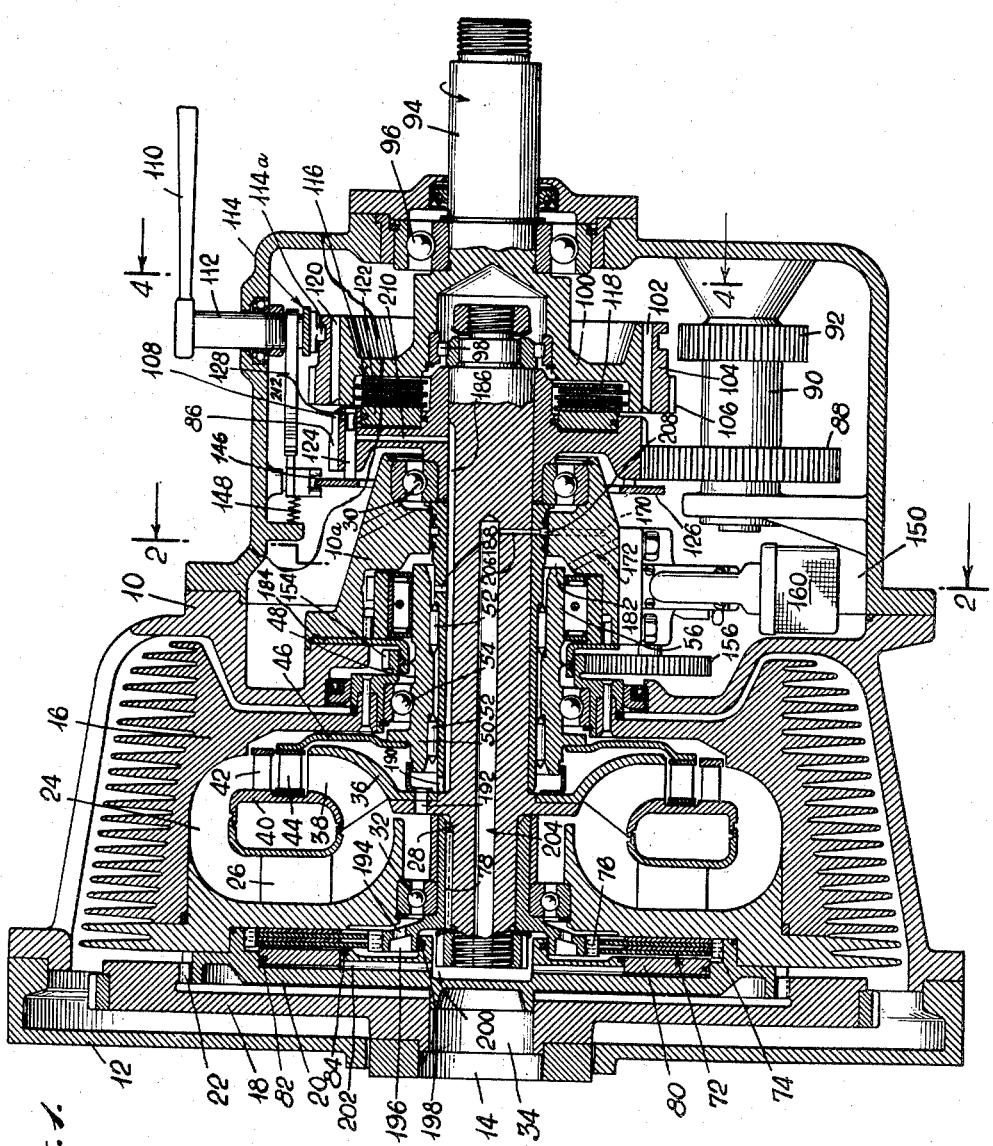
Fig. 1 is a longitudinal central section of a transmission embodying the invention, certain portions of the mechanism in the upper right hand corner of the figure being rotated into the plane of the drawing for purposes of illustration.
Figure 11:
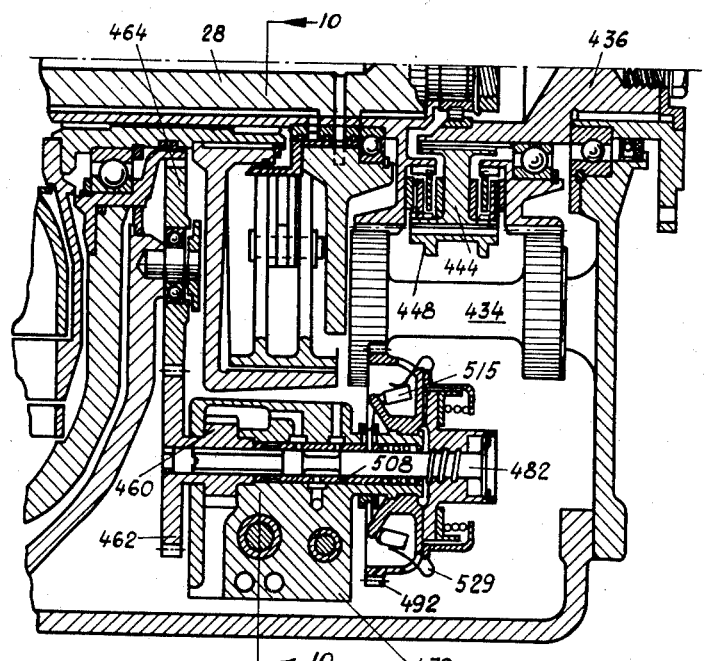
Fig. 11 is a section taken one the line 11—11 of Fig. 10.

Referring now more particularly to Fig. 1 and related figures, the transmission illustrated comprises a rotationally fixed outer housing indicated generally at 10 and adapted to be fixed to the bell housing or other fixed part 12, of, for example, an internal combustion engine, the crank or driving shaft of which is indicated at 14 and which for purposes of the present description may be considered as the power input or driving member. Rotatably mounted within the fixed housing 10 is the rotating converter casing 16 which in the present embodiment is driven through the medium of the engine flywheel 18 fixed to the shaft 14 and a drive element 20 rotationally fixed to the casing 16 and driven from the flywheel through the medium of the meshing teeth or splines 22.

The casing 16 provides a chamber 24 for circulation of the hydraulic working fluid and also carries a ring of pump or impeller blades 26.

An axially central turbine member 28 is carried by a bearing 30 mounted on an internal extension 10a of the fixed housing and bearing 32 carried by the rotating casing 16, the latter being centered radially with respect to the engine shaft and flywheel by means of the annular flange 34 on the element 20 which engages a suitable bore in the flywheel 18.

The turbine element is provided with a disc-like portion 36 located in the hydraulic chamber 24 and carrying a row of turbine blades 38 which serve to support an internal ring member 40 which carries a second row of turbine blades 42. Between blades 42 and 38 a row of reaction or guide blades 44 is supported by the disc-like portion 46 of a reaction member 48 which comprises in part a hollow shaft or sleeve portion 50 concentrically mounted around the shaft part of the turbine member 28 and supported by bearings 52 between the two shaft parts and a bearing 54 between the reaction member and a radially inwardly projecting part of the rotating casing 16.

The shaft part 50 of the reaction member provides the inner race 56 of a freewheel clutch having engaging elements 58, which may be of block-like form as shown in Fig. 2 or of the usual roller form acting against cam surfaces. The clutch engaging elements 58 are set so as to engage at times when under the influence of the hydraulic working fluid the reaction member tends to turn counter to the direction of rotation of the pump or driving member.

The inner extension 10a of the fixed housing 10 as seen more clearly in Fig. 2, is formed with a circular recess the wall of which is provided with peripherally spaced internal splines or teeth 60 and between these teeth and the clutch elements 58 there is interposed an annular ring 62 providing the outer race 64 of the overrunning clutch, which is engaged by the elements 58 and which is also provided with spaced externally projecting splines or teeth 66 adapted to intermesh with the splines 60 on the stationary housing member. As will be evident from Fig. 2 the spacing of the splines 60 and 66 in relation to their peripheral width is such as to permit the ring 62 to have limited peripheral movement, with the splines 60 and 66 acting as positive stops for determining the range of this movement.

For purposes to be hereinafter described there is provided an axially shiftable operating pin or rod 68 mounted in the housing part 10a to move in a direction tangent to the circle of the ring 62 and adapted to be actuated by means of a suitable abutment 70 on ring 62.

For effecting a direct mechanical connection between the driving member of the transmission and the turbine member a multiple disc friction clutch indicated generally at 72 is provided. This clutch comprises driving plates 74 rotationally fixed by and axially movable on suitable splines formed internally on the driving element 20 and driven plates 76 rotationally fixed and axially movable on suitable splines formed on a disc part or spider 78 keyed to and in effect forming a part of the turbine member 28. Clutch 72 is engaged by an operating member 80 in the form of an annular plate or piston located in a suitable recess of like configuration in the driving element 20, between which and the plate 80 there are provided suitable packing rings 82 and 84.

In the present embodiment, the transmission is provided with a gear mechanism for transmitting drive positively in either forward or reverse direction from the turbine member and also providing a neutral position. This mechanism, which for convenience will be hereinafter referred to as the reversing gear, embodies a pressure fluid actuated synchronizing clutch which advantageously is operated by the same hydraulic system as that operating the direct drive clutch 72. In order to effect reverse, the turbine member 28 is provided with a gear 86 meshing with gear 88 carried by a counter-shaft 90, which also carries gear 92. The tail shaft 94, which is carried by bearing 96 in the stationary housing and by a second bearing 98 between it and the turbine member 28, is provided with a hub portion 100 having external splines 102 on which is slidably mounted the annular reversing ring member 104 provided with teeth 106 adapted to engage a reversing idler gear 93 (Fig. 4) meshing with the counter-shaft gear 92.

A portion of the face of gear 86 on the turbine member is provided with teeth or splines 108 adapted to engage with the internal teeth of the reversing ring member when the latter is shifted to a position to the left of that shown in Fig. 1, such shift being effected by means of the reverse lever 110 turnable to rotate the reversing post 112 to which is fixed the shift yoke 114 having projections 114a engaging a suitable groove in the reversing ring 104. When the ring is shifted so that teeth 108 mesh with the internal teeth of the ring which also are engaged by splines 102, a direct forward driving connection is established between the turbine member and the tail shaft. In the position of ring 104 shown in Fig. 1 a neutral is established in which driving connection between the turbine member and the tail shaft is broken. Movement of the reversing ring to the right of the position shown in the figure disconnects the direct driving connection and causes gear 106 to mesh with the reversing idler gear so that reverse drive to the tail shaft is effected.

Since normally, when in neutral position with the driving member turning, the turbine member 28 is also turning under the influence of the hydraulic drive, it is necessary in order to secure either direct or reverse drive without clashing to synchronize the turbine member with the tail shaft before the meshing teeth are brought into engagement, and for this purpose the pressure fluid actuated synchronizing clutch indicated generally at 116 is provided. The construction of this clutch is in general similar to that of clutch 72, comprising a number of what may be considered driving plates 118 splined on the turbine member and a number of driven plates 120 splined on the outer wall of a recess formed in the hub portion 100 of the tail shaft. A clutch operating member 122 in the form of an annular plate is subjected to the action of pressure fluid in a manner hereinafter to be described, under the control of one or more control valves 124 which are actuated through the medium of a valve actuating ring 126 the position of which is controlled by means of the plates 128 (Fig. 4) fixed to turn with the post 112 and yoke 114. In Fig. 3 one of the plates 128 is more clearly shown and since plates 128 and the parts coacting therewith are duplicates, it will be sufficient to describe but one. Plate 128 is provided with three notches 130, 132 and 134 between which there are cam surfaces 136 and 138. An operating arm 140 provided with a projection 142 adapted to engage the notches in plate 128 is pivoted to the stationary casing on the pin 144 and is provided at its free end with projecting lugs or ears 146 adapted to engage the valve actuating ring 126. The operating arm 140 is held in engagement with the plate 128 by means of spring 148 (Fig. 1).

As will be seen from Figs. 1 and 3, when the reverse lever 110 is in neutral position the projection 142 is engaged in the notch 130 of plate 128. If the lever is moved to engage direct drive the first movement of the lever from neutral lifts the projection 142 out of the notch 130 on to the cam surface 136, thus swinging the arm 140 to the right as seen in Fig. 3 and to the left as seen in Fig. 1, or in other words forwardly with respect to the longitudinal axis of the transmission. This in turn moves the valve ring 126 and the valve or valves 124 in the same direction to admit pressure fluid to the synchronizing clutch operating member 122. This serves to engage the clutch and, assuming the tail shaft to be stationary, acts to bring the turbine member to rest to permit the direct drive engaging teeth to be meshed without clashing. When direct drive position is reached the projection 142 drops into the direct drive notch 132 on plate 128 and under the action of the spring 148 the operating arm 140 is returned to the neutral position in which pressure fluid is cut off from the clutch so that the clutch is disengaged. When the reversing lever is moved from neutral position to reverse position, substantially the same action takes place, the projection on the operating lever 140 being lifted out of the neutral notch and traveling along the cam surface 138 so that the control valve or valves admit pressure fluid to engage the synchronizing clutch until after the reverse gear teeth have been meshed, when the projection 142 drops into the reverse notch 134 to cut off pressure fluid and permit the clutch to disengage.

As previously noted, both clutches 72 and 116 are advantageously controlled by a common hydraulic pressure system which will now be described with reference particularly to Figs. 1, 2, 3 and 8. The stationary housing 10 provides a sump 150 for liquid for operating the hydraulic torque converter and also for the operation of the clutches. A pump 152, preferably of the gear type, is carried by the extension 10a of the stationary housing, this pump being driven by means of gear 154 carried by the rotating casing 16 and meshing with the gear 156 on the pump shaft. Pump 152 draws liquid from the sump through the inlet connection 158, preferably provided with a suitable strainer 160, and delivers fluid under pressure through a discharge conduit 162 to a master control valve indicated generally at 164. This control valve comprises a housing 166 having a cylindrical bore in which is slidably mounted the valve member 168 for controlling flow of pressure fluid discharged from the pump to the conduits 170 and 172, and return flow through conduits 174 and 176, as appears more clearly from the flow diagram of Fig. 8. In the structural embodiment, the pressure conduits 170 and 172 are, as shown in Figs. 1 and 2, formed by suitable bores in the stationary housing extension 10a. The pressure conduit 162 is formed by a bore in the pump housing 166 while the return conduit 176 is formed by a further bore in the housing lying outside the plane of Fig. 2 (see Fig. 3). The conduit 174 is provided by a further bore (Fig. 2) which joins the conduit 176 as indicated in the diagram of Fig. 8. Conduit 176 is in communication with a spring loaded pressure relief valve 178 while the pressure conduit 162 from the pump is in communication with a second pressure relief valve 180. The spring loads on these two valves are adjusted so that valve 178 will be opened by a lower value of fluid pressure than valve 180 and for the purposes of this description these valves may therefore be referred to respectively as low pressure and high pressure relief valves. As will be seen more clearly from Fig. 1, the pressure conduit 172 communicates with a pressure chamber 182 located between the stationary housing portion 10a and the rotatably mounted turbine and reaction members. The forward end of this chamber is blocked off by a suitable diaphragm member 184 having suitable pressure packed relation with respect to the portion of the rotating casing carrying the pump gear 154 and the shaft portion of the reaction member. The shaft part of the turbine member 28 is provided with one or more longitudinally extending grooves or channels 186 which are placed in communication with the pressure chamber 182 by means of one or more radial holes 188. The hydraulic working chamber 24 is placed in communication with the channels 186 by means of one or more radial openings 190 in the turbine shaft at the forward end of channels 186 and ports 192 passing through the disc portion 36 of the turbine member. Ports 194 in the clutch spider 78 admit pressure fluid to the space 196 between the driven element of the clutch and the driving element 20, there being a piston ring seal 198 between these parts to separate the space 196 from the chamber or space 200 between the driving element 20 and the forward end of the turbine member 28. Space 200 is placed in communication with the recess in which the clutch operating plate moves by means of one or more radially extending bores 202 in the element 20.

An axially central bore 204 in the turbine member 28 communicates at one end with the space or chamber 200, and at its other end communicates with one or more radial bores 206 which extend to the surface of the shaft of member 28 at places peripherally spaced between the axially extending channels 186 in member 28. Bores 206 communicate with an annular external groove 208 on the turbine member which in turn communicates with the conduit 170 leading from the control valve.

The channels 186 of the turbine member extend rearwardly to communicate with radial bores 210 which conduct pressure fluid to the valve chambers in which the control valves 124 are located, these valve chambers being vented by means of passages 212.

The operation of this system under the control of the master valve 164 is as follows, it being assumed that hydraulic working fluid under pressure is being supplied by pump 152 through the conduit 162, the maximum pressure of the fluid being determined by the high pressure relief valve 180. In the position of the control valve shown in Fig. 8 the apparatus is set for hydraulic drive, since the pressure supply conduit 162 is connected by means of conduit 172, chamber 182, channels 186 and ports 190 and 192 with the working chamber 24 of the converter so that the working fluid is maintained in this chamber under a predetermined minimum static pressure, the value of which is governed by the loading of the relief valve 180. The hydraulic fluid under pressure also, through bearing 32 and ports 194, is admitted to the chamber 196 and from this chamber has access to the chamber in which the clutch plates of clutch 72 are located and to one face of the clutch operating plate 80. The hydraulic fluid thus operates to separate the clutch plates and also acts on the operating plate 80 to retract the latter so that the clutch is disengaged. There is a certain amount of leakage of the pressure fluid past the piston ring seal 198, the leakage fluid flowing to chamber 200 and from there through the bores 204 and 206, groove 208 and conduit 170 to the master valve which in this position of the valve connects conduits 170 and 176, to permit flow of leakage fluid back to the sump. The desired pressure differential between the high pressure fluid and the leakage fluid is maintained by the load on the low pressure relief valve 178 in the return conduit leading back to the sump.

If, now, the master valve is moved to the right from the position shown in Fig. 8, the pressure fluid supply conduit 162 is connected with conduit 170 and through the groove 208 and bores 206 and 204, chamber 200 and bores 202 the fluid is admitted behind the clutch operating plate 80 so that the clutch is engaged and a direct mechanical drive connection established between the power input member and the turbine member for the establishment of direct mechanical drive. A certain amount of pressure fluid leaks from chamber 200 past the piston ring seal 198 to chamber 196, and through ports 194, bearing 32, ports 192 and 190, channels 186 and chamber 182 is returned to the conduit 172, which in the assumed position of the valve member 168 is in communication with the conduit 174 which returns the leakage fluid to the sump, while desired minimum pressure of the leakage fluid is maintained by valve 178. This in turn serves to maintain a desired minimum static pressure in the working chamber 24 of the converter, in which it is desirable to maintain a certain value of static pressure even though the hydraulic mechanism is not in action.

When the master valve is set in the position shown in Fig. 8, which provides for converter drive, the channels 186, as previously explained, are filled with high pressure actuating fluid so that this high pressure fluid is available for engaging clutch 116 to provide synchronization for either direct or reverse drive. The manner of actuating the control valves 124 by manipulation of the lever 110 has previously been explained and from Fig. 8 it will readily be apparent that if the valves are moved to the left the pressure fluid will be admitted to the clutch operating plate 122 for engaging the clutch. When, as previously explained, the valves are returned to positions corresponding to those shown in Fig. 8 after forward or reverse drive engagement has been effected, the pressure fluid connections 210 are cut off by the valves and the operating chamber of the clutch vented through the relief connections 212. In this connection it is to be noted that whether in forward or reverse drive the clutch rotates and centrifugal force will ordinarily be sufficient to cause the clutch operating fluid to be thrown out of the operating chamber, creating sufficient vacuum to cause disengagement of the clutch plates so that the clutch does not remain engaged when the gear is shifted from a driving position back to its neutral position. Obviously, dished plates or other means such as retracting springs may be employed to insure disengagement of the clutch when engaging fluid is not admitted to it.

It is desirable that reverse drive be obtained only when the transmission is set for hydraulic drive and not for direct mechanical drive. Means to be described later have therefore been provided which insures that the master control valve is always set to the position giving hydraulic drive before the synchronizing clutch can be engaged.

It is characteristic of hydraulic torque converters of the kind under consideration that as the speed of the turbine or driven member approaches that of the pump or driving member the ratio of the secondary torque to the primary torque, which is ordinarily maximum when the turbine member is stalled, decreases until a point is reached where the input and output torques are equal and if the speed of the turbine member relative to the speed of the pump increases beyond this ratio the output torque becomes less than the input torque. Obviously no advantage and considerable disadvantage is involved if the speed of the turbine member relative to that of the pump member is permitted to rise above the value at which no torque increase is obtained and at or before the speed ratio where no torque increase is produced it is desirable to shift from the hydraulic drive to an alternative form of drive which in the present instance is a direct mechanical drive. The ratio at which this change should be made is usually referred to as the shift point of the transmission.

In accordance with one of the aspects of the present invention an automatic control for effecting shift from hydraulic to mechanical drive is provided, and the mechanism by means of which this is effected will now be described.

Referring more particularly to Figs. 2 and 3, a bell crank type of lever 214 is pivoted on a stud 216 carried by the extension 10a of the fixed housing. Lever 214 has an arm 218 located to be contacted and moved by the actuating rod 68 associated with the overrunning clutch which holds the reaction member against counter-rotation. The second arm 220 of lever 214 is provided with a laterally extending lug or ear 220a serving as an abutment for a spring 222 which is held in compression between the lever and a suitable seat on the housing part 10a. The force exerted by the spring and tending to move the lever 214 in counter-clockwise direction as viewed in Fig. 2 may be varied by turning the stud 224, which is threaded in the ear 220a and which carries the spring retaining cup 226, so as to shorten the length of the spring in any given position of the lever 214.

An extension 220b on arm 220 is provided with a slot engaging the head 228 of the master control valve member 163 so that the latter is actuated by movement of the lever.

In addition to providing for automatic shift from hydraulic to mechanical drive, it is also desirable to enable the operator to overrule the automatic shift so as to be able to effect shift from one type of drive to the other at will, and as has previously been mentioned it is desirable to provide means for preventing engagement of reverse unless the master control valve is set to provide hydraulic drive. To secure this latter function an interlocking mechanism is provided which comprises a lever 230 which is pivotally mounted intermediate its ends on a pin 232 carried by suitable ears on the stationary housing 10. One arm 230a (Fig. 6) is provided with an abutment surface 230b adapted to engage the extension 220b of lever 214. The other arm 230c of lever 230 is provided with a projection 230d. The shift yoke 114 is provided at one side with a depending extension 114b which at its lower end is provided with a transversely extending arcuate arm 114c provided with a cam face comprising two portions 114d and 114e parallel with each other but offset and joined by the cam rise 114f.

With the reversing lever 110 set as shown in Fig. 1 so that the parts are in neutral position, the position of the extension 114c of the yoke 114 is as shown in Fig. 6 so that the projection 230d of lever 230 is in engagement with the cam surface 114e, which holds lever 230 against clockwise turning movement as viewed in Fig. 6 and maintains the abutment surface 230b substantially in contact with the extension 220b on the lever 214. With the parts in these positions it will be seen from Fig. 2 that the lever 214 is prevented from turning counter-clockwise from the position shown in Fig. 2 and with the lever in the position shown the master valve 164 is set to the position which corresponds to that shown in Fig. 8, which as previously described provides hydraulic drive.

If now the lever 110 is shifted to engage reverse, the extension 114c of the shift yoke 114 moves to the left as seen in Fig. 6 so that the projection 230d moves along the cam surface 114e, which operates to continue to hold the lever 214 and the master valve 164 in the same position, thus insuring that the mechanism is set for hydraulic drive if reverse is engaged.

On the other hand, if forward drive is desired the shift yoke is turned in the opposite direction so that the extension 114c moves to the right as seen in Fig. 6 and the projection 230d passes down the cam rise 114f to the cam face 114d. This permits lever 230 to turn clockwise as seen in Fig. 6, the lever 214 then being, so far as lever 230 is concerned, free to move counterclockwise as seen in Fig. 2 under the influence of the spring 222. Counter-clockwise movement of lever 214 from the position shown in Fig. 2 will operate to shift the master valve to a position providing for direct mechanical drive, so that when the shift fork is set for forward drive the master valve can be in either of its two positions, depending upon the position of lever 214, the position of the latter, however, being determined under different conditions by other factors hereinafter discussed.

Insofar as the automatic shift from hydraulic to direct drive is concerned, the manner in which the position of lever 214 is shifted to effect this function will later be described, but as previously noted it is desirable to provide a manually controllable overrule mechanism by means of which hydraulic or direct drive can be secured at will, subject to certain limits operative to prevent the operator from overruling the automatic shift to establish direct drive under conditions when such drive should not be employed.

The overrule mechanism comprises an operating lever 234 (Fig. 2) operative to turn an overrule control member indicated generally at 236, rotatably mounted in a suitable bearing carried by the stationary housing 10. Member 236 is provided with an arcuate arm portion 236a provided with notches 238, 240, and 242 (Fig. 7) adapted to be engaged by a position retaining pin 244 resiliently loaded by the spring 246 carried in a suitable bore in the housing 10. An arm 236b is provided which depends from the rotatably mounted post portion of member 236. This arm at its lower end comprises a section 236c lying in a plane normal to the axis of turning movement of the member 236, a section 236d extending obliquely to one side of said plane and a section 236e extending obliquely to the other side of said plane.

The arm 220 of lever 214 is provided with a laterally projecting extension 220c in which there is located a slot 248 through which the arm 236b of member 236 extends. As will be seen more clearly from Fig. 5, the width of the slot 248 is substantially greater than the thickness of the arm 236b to permit lateral movement or play between the parts. Also the arm 220c is provided with a bore for the reception of a spring 250 acting on a pin 252 tending to resiliently hold the arm 236b in spaced relation with respect to the wall 248a of the slot 248.

In the position of the parts as shown in the figures the overrule lever is in its neutral position which will permit freedom of movement of the lever 214 under the influence of the automatic control, provided that the reversing mechanism is not set for reverse drive, which provides the interlock preventing lever 214 from assuming a position under such conditions which will permit of a direct drive connection through the transmission.

If the lever 234 is shifted so as to bring the lever upwardly from the plane of the paper as seen in Fig. 2, the member 236 is turned counter-clockwise as viewed in Fig. 7 to bring the retaining pin 244 into the notch 242, and the arm 236b is moved downwardly as viewed in Fig. 5 to bring the section 236d into contact with the wall 248b of the notch 248 in lever 214. This provides a positive mechanical lock preventing movement of lever 214 in counter-clockwise direction from the position seen in Fig. 2 and consequently insures positioning of the master valve 164 so that the mechanism is set for hydraulic drive.

If, on the other hand, the lever 234 is turned downwardly behind the plane of Fig. 2 the reverse action takes place, the pin 244 being shifted into the notch 240 and the arm 236b being moved upwardly as seen in Fig. 5 to bring the oblique section 236e into contact with the pin 252 so as to resiliently move the lever 214 in counter-clockwise direction and shift the valve 164 to the position effecting direct drive.

As previously described, the interlocking lever 230 prevents movement of lever 214 in counter-clockwise direction from the position shown in Fig. 2, to effect direct drive positioning of valve 164, if the mechanism is set for reverse drive. Consequently, the manual overrule mechanism must be provided with a safety interlock which will prevent the overrule from shifting the mechanism to direct drive position if the reversing mechanism is engaged in reverse position. This safety interlock is provided by the spring 250 and the resiliently loaded pin 252.

If for example it is assumed that the reverse gear mechanism is in either neutral position or reverse position the projection 230b on lever 230 will be in the position shown in Fig. 2 and will prevent counter-clockwise movement of lever 214 from the position shown in Fig. 2, which would shift the control valve to direct drive position. If under the assumed condition, it were attempted by means of the overrule mechanism operated by lever 234 to shift to direct drive this would not be possible since the resultant movement of the arm 236b upwardly as seen in Fig. 5 to bring the section 236e in contact with pin 252 would merely result in retracting pin 252 against the pressure of spring 250, without resulting movement of lever 214. If this resilient connection, which in effect under certain conditions constitutes a lost motion connection, were not employed, damage or breakage of the parts might be caused by the cam action of the section 236e attempting to shift a member in a direction prevented by the abutment formed by the projection 230b on lever 230.

The operation of the above described apparatus is as follows. In the position of the parts shown in the figures and assuming the apparatus to be driven by a conventional righthand engine, the direction of rotation of the pump and turbine elements will be counter-clockwise in Fig. 2 as indicated by the arrow 254. Since the reverse gear parts are in neutral position the lever 214 is held in the position of rotation shown in Fig. 2 by the action of spring 222 and that of the abutment 230b which limits the counter-clockwise movement of the lever under the influence of the spring.

Since no torque is transmitted under the assumed conditions, the reaction member of the converter will also tend to rotate in counter-clockwise direction as seen in Fig. 2, this movement being permitted by the action of the overrunning clutch. Due to the unavoidable friction in the clutch even when overrunning, the outer clutch ring 62 will be moved counter-clockwise to one of its limit positions determined by the engagement of the splines 60 and 66. In this position of the parts there is a certain amount of axial clearance or play for movement of the actuating rod 68 which may for example be in the position shown in Fig. 2 or with one of its ends abutting against the lever arm 218, with clearance between the rod 68 and abutment 70 on ring 62.

If now the gearing is shifted so as to engage for forward drive, the extension 114b on the shift fork 114 is shifted to permit the abutment 230d to move from the cam surface 114e to the cam surface 114d. This permits the abutment 230b to move to the right as seen in Fig. 2 and further permits counter-clockwise movement of lever 214 from the position seen in Fig. 2 under the influence of spring 222 so as to take up the play between the lever arm 218 and the abutment 70, between which parts the operating rod 68 is held in compression. For the purposes of describing the present action it is further assumed that the overrule lever 234 is in neutral position so as to have no influence on the automatic action, lever 214 being able to move counter-clockwise from the position shown in Fig. 2 insofar as the overrule mechanism is concerned due to the clearance in the slot 248.

If it is assumed that the vehicle is standing still with the reversing gear in neutral position and with engine idling, a shift to engage forward drive will operate first to stop rotation of the turbine member of the converter. With this member stationary, reaction torque will be applied to the reaction member by the working fluid being circulated in the converter and this torque will operate, through members 62 and 68 to maintain lever 214 in the position shown in Fig. 2, against the action of spring 222, even though the lever 214 is free to turn counter-clockwise from the position shown so far as any stop provided by abutment 230b is concerned. Thus, under starting conditions for forward drive, valve 164 is held in the position determining hydraulic drive by the action of reaction torque instead of by a positive mechanical lock of the kind which is effected when the mechanism is set for reverse drive.

As long as sufficient power is being transmitted through the hydraulic circuit and further as long as the ratio between the speeds of the driving and driven members of the hydraulic mechanism is such that appreciable torque multiplication is being effected, the hydraulically applied reaction force on the reaction member, acting through the overrunning clutch and the movable ring 62, will maintain the latter in its terminal position which holds the lever 214 and valve 164 in positions maintaining hydraulic drive. However, if and when the speed of the turbine member relative to the pump or driving member rises to a ratio such that no torque increase is accomplished by the hydraulic mechanism, at which time no reaction torque would be applied to the reaction blades tending to turn them counter to the direction of the pump and turbine, spring 222 acts to turn lever 214 counter-clockwise and shift the control valve 164 to its position effecting shift to direct drive. If it is desired to have the shift from hydraulic to direct drive automatically made exactly at the theoretical shift point where the torque ratio between input and output is exactly one to one, then the tension of spring 222 should be set so that it exerts only enough force to overcome the frictional resistance of moving the valve 164 and shifting the ring 62 from one to the other of its terminal positions. In some instances it may be desirable to have the automatic shift to direct drive effected while there is still some increase in torque effected by the hydraulic drive. This may readily be effected by increasing the tension of spring 222 so that it is sufficient not only to overcome the friction necessary to effect the shift but also to shift the ring 62 in counter-clockwise direction as seen in Fig. 2 before the value of the hydraulically applied reaction force acting on the reaction blades and tending to turn the ring 62 in clockwise direction as seen in Fig. 2 drops to zero.

With the apparatus set for forward drive so that either hydraulic or direct drive is available in accordance with operating conditions, it may be desirable to shift from hydraulic drive to direct drive when the speed of the turbine member relative to that of the pump member is lower than that required to effect the automatic shift. This is accomplished by the overrule mechanism the operation of which will be generally understood from the previous description. If direct drive is desired at a time when the automatic control leaves the mechanism in hydraulic drive the overrule lever is depressed as seen in Fig. 2 to bring the section 236e of the arm 236b into contact with the pin 252 and turn the lever 214 counter-clockwise so as to move the control valve 168 to the right as seen in Fig. 2 and shift to direct drive. This overrule ability should not, however, be available under conditions where high values of torque are required to be transmitted through the tail shaft, since to make such a shift under such conditions might readily result in excessive wear on the direct drive clutch and/or stalling of the engine. This limitation on the overrule is also provided by the spring loaded pin 252 which prevents setting the mechanism for direct drive when the gearing is set in either neutral or reverse position. If under the assumed running conditions the overrule is shifted to direct drive position the section 236e acting on pin 252 has to move the lever 214 counter-clockwise not only against the resistance of the control valve which must be shifted but must also turn lever 214 against the existing reaction resistance applied to the ring 62 and the operating rod 68. Consequently, depending upon the strength of the spring 250 in relation to the reaction resistance exerted through the operating rod 68, the manual overrule for shifting to direct drive may be effective or ineffective. If the degree of torque multiplication and the resulting hydraulically applied reaction is too high to warrant shifting to direct drive, then the force required to shift lever 214 will be more than can be effected through the spring 250 and instead of the overrule member moving lever 214 it will merely operate to retract the pin 252. On the other hand, if a shift to direct drive is warranted, the hydraulic reaction, resisting movement of the lever 214, will be insufficient to compress spring 250, so that movement of the overrule member will move the lever and the control valve to the direct drive position.

For return from direct to hydraulic drive the overrule mechanism is employed, the overrule lever being turned so as to be lifted out of the plane of Fig. 2, causing the section 236d of the lever 236b to engage lever 214 and shift the control valve 164 to the hydraulic position. Depending upon the nature of the control desired, many different arrangements may be employed for effecting this under the control of the operator, as for example by suitable interconnection with the engine throttle or with the brake pedal of a vehicle.

The shift point at which it is desirable to change from hydraulic to direct drive occurs usually when the ratio of turbine speed to pump speed is of the order of 0.7 or less and when the shift is made to direct drive this ratio is changed to a one to one ratio. This change in the ratio requires either that the engine speed be slowed down to the tail shaft speed or the latter accelerated to the engine speed, or a combination of both, and this change may under certain circumstances produce a noticeable surge in the operation of a vehicle or other drive. In order to eliminate or diminish any noticeable surge occurring when shift is made, the power and speed of the engine may momentarily be decreased at the instant of shift, as for example by means of an auxiliary throttle or an overrule mechanism acting momentarily on the main throttle or by a momentary ignition cut out. Such an arrangement requires an impulse operative at the time when shift is made, and the present arrangement may if desired include means for providing such an impulse as is more or less diagrammatically shown in Fig. 2. As shown in this figure the casing 10 carries a switch mechanism indicated generally at 256 for delivering the desired impulse through a circuit indicated by the wires 258 and 260. In the embodiment illustrated, wire 258 terminates in a fixed contact 262 while the wire 260 is connected to a pivoted lever 264 having a projecting arm 266 adapted to be contacted and moved by the end of the lever arm 218. The other arm 268 of lever 266 is resilient and provided with a contact 270 located to make contact with the contact 262 when the lever is turned clockwise as viewed in the figure. The lever is biased to neutral position by springs 272 and 274.

When shift is made from hydraulic to direct drive the end of the lever arm 218 moves to the left as seen in Fig. 2 and contacts the lever arm 266 to momentarily turn the lever and close the electrical circuit to provide an impulse for momentarily reducing the engine speed in any desired manner. This impulse is only momentary since the lever 218 passes the lever arm 266 which is returned to neutral position by the springs 272 and 274. When shift is made from direct drive to hydraulic drive no decrease of input speed is required, even momentarily. When this shift is made the lever arm 218 moves to the right and passes the lever arm 266, momentarily turning the lever counter-clockwise, which movement, however, has no effect on the electrical circuit.

Referring now to Fig. 9 and related figures, another form of transmission is disclosed in which the construction of the hydraulic torque converter is essentially the same as that shown in Fig. 1 and with reference to which like parts are designated by like reference characters.

In the present embodiment the principal difference lies in the control system which provides for added operating features to be hereinafter more fully described.

Referring now specifically to Fig. 9, it will be seen that not only is the hydraulic circuit the same as shown in Fig. 1, but also the direct drive clutch is of essentially the same construction except for the addition of a series of coil springs 400 located in suitable cavities in the drive element 20 and the clutch operating member or plate 80. These springs are installed under a suitable initial compression pressure to cause engagement of clutch 72 in the absence of sufficient counter-acting fluid pressure to disengage the clutch. The engaging pressure of the springs 400 alone is sufficient to transmit enough torque through the clutch to start the engine by pushing the vehicle in which the transmission is installed and they also assist or boost the action of the fluid pressure acting to engage the clutch under normal direct drive operating conditions. On the other hand, pressure of the springs is insufficient to maintain the clutch engaged against the opposing fluid pressure under normal hydraulic operating conditions. If, however, with the mechanism set for hydraulic drive the speed of operation falls to a value corresponding to less than normal engine idling speed, with consequent fall in pressure of the clutch operating fluid to a low value, springs 400 will cause engagement of the direct drive clutch so that the engine can be driven by movement of the vehicle, until such time as the proper operating fluid pressure is restored. Thus means are provided for automatically connecting the engine to the driven member of the converter if the engine should stall, and automatically disconnecting the engine from the driven end of the converter when the engine again starts and if the mechanism is set for hydraulic drive.

Also, if the driven end of the converter is positively connected to the vehicle wheels (in other words, if a further gearing is not set in neutral position) this clutch arrangement affords a parking brake for the vehicle, utilizing the engine as the braking load.

For vehicle transmissions of the character under discussion it is not only necessary to provide a gear for reverse drive as well as forward drive, but it is also desirable to provide a definite neutral position in which the transmission is disconnected from the vehicle wheels.

Also for many kinds of vehicles, it is desirable if not essential to provide braking power (other than mechanical friction braking power such as is supplied by wheel brakes) which is of greater magnitude than can be supplied by engine braking through a direct drive connection. In other words, many vehicles require engine braking power comparable to that obtained by engine braking in second gear for example, in the conventional type of three-speed mechanical gear.

In the present embodiment of this invention, means are provided in the form of a brake between the rotatably mounted reaction member of the converter and the stationary casing which enables additional braking power other than engine braking power to be employed if desired, and which also facilitates shifting of the gear mechanism from a neutral position to either forward or reverse drive, as will hereinafter be more fully described.

Referring to Figs. 9 and 10, the brake for holding or releasing the reaction member of the converter is indicated generally at 402 and comprises a disc 404 providing a brake drum 406 fixed to the shaft part 48 of the reaction member. Braking is effected by two brake shoes 408 which are pivotally supported at one end by means of links 412 and bolt 414, the latter being carried by the portion 10a of the stationary casing. The other ends of the shoes are provided with roller pins at 416 moving against the cam surface of the brake cam 418. Cam 418 is in turn pivotally mounted on the casing structure 10a by a pin 420 and controlled by means of lever 422 actuated by servomotor 424 through the piston rod 430, the latter rotating the lever 422 and cam 418 in counter-clockwise direction as seen in Fig. 10 to effect braking. The shoes 408 are retracted by the usual spring 432. Other forms of friction brakes may be used and if desired may be directly fluid pressure actuated in the same manner as the direct drive clutch 72. An example of such alternative construction is the multiple disc fluid pressure piston actuated reaction member brake disclosed in my aforesaid Patent No. 2,676,497.

From the drawings it will be evident that engine braking in direct drive can be obtained through engagement of the direct drive clutch 72 and it will further be evident that additional braking power derived from the converter can be obtained if the reaction member is held rotatably stationary by the brake 402 when the direct drive clutch is engaged. Under such conditions, assuming the driven end of the transmission to be driven by the vehicle wheels, both the pump and turbine blades of the converter will be rotated but the guide blades are held stationary, thus creating additional braking resistance in the converter itself.

The present embodiment, like that shown in Fig. 1, includes gearing mechanism interposed between the turbine member 28 and a tail shaft 436, for providing forward and reverse drives and a neutral. In the present arrangement a reverse countershaft gear 434 may be engaged between member 28 and a shaft 436 by means of a dog clutch 438 to effect direct or reverse drive. The clutch 438 is provided with friction synchronizing plates 440 and 442. The clutch comprises a double bell shaped disc 444 axially slideable on splines on the tail shaft 436. The disc 444 has an outer rim 446 fitting internal splines on a ring 448 rotationally stationary and axially slideable on the disc 444. Axial movement of the ring is effected by means of a forked lever 450 acting in an external peripheral groove in the ring. A series of spring loaded balls 452, which in neutral position of ring 448 rest in small recesses with suitably inclined side walls, increase the clutch plate pressure during synchronizing to a value determined by the spring force acting on the balls and causing the balls to resist movement out of the recesses onto the axially extending part of the ring 448.

The mechanism is shown in neutral position in Fig. 9 and forward drive is obtained by moving the ring 448 to the left from the neutral position as viewed in Fig. 9. During the first part of the movement disc 444 and ring 448 move as an integral member on shaft 436 due to the radial pressure exerted by balls 452 but as soon as the friction plates of the synchronizer come into contact the outer ring 448 begins to move axially in relation to the disc 444 and consequently the balls 452, climbing the slopes of the recesses, further increase the axial force necessary to displace the outer ring in relation to the shift disc. The pressure of the springs as well as the slope of the walls of the recesses is so predetermined as to give desired surface pressure between the synchronizing plates, so that when the outer ring 448 meets the forward drive gear 451 on the turbine member the latter member and the tail shaft are fully synchronized, whereupon the mechanical connection can be completed by further moving the ring 448 to the left to engage gear 451. The meshing ends of the gear teeth are preferably beveled and the walls of the recesses are formed so that pressure on the synchronizer plates is released when engagement has been completed, due to the fact that the balls 452 are pressed against surfaces parallel to the axis of the shaft. In the same way reverse gear 456 and the output shaft 436 are synchronized and engaged to give reverse drive through the usual reversing gear 499 (Fig. 13).

In vehicle drives it is always advantageous to have a neutral position in which there is a definite break in the line of power transmission between the driven or secondary member of the transmission and the propeller shaft or equivalent drive to the vehicle wheels, which in the present case may be considered as represented by the tail shaft 94 in Fig. 1 or the tail shaft member 436 shown in Fig. 9. From such neutral position shift must be made to different power transmitting gearings which in the present embodiments illustrate only direct drive forward gearing and reverse gearing but which may also include additional gearing providing for either a mechanical gear reduction which may be either in forward or reverse drive or a mechanical step-up gearing, commonly referred to as an overdrive, which ordinarily is effective only for forward drive. If positive drive connections are employed for such supplemental gearing, in contrast with planetary types of gearings which are made effective through the engagement or release of friction clutches or brake bands, some form of synchronizing means is desirable to enable the positively connecting parts to be engaged without clash, such as the synchronizing arrangement previously described herein, and in accordance with one aspect of the present invention the size of such synchronizing devices may be considerably reduced by decreasing the torque transmitted from the secondary member of the transmission during a shifting operation from neutral to a gear position or from one gear position to another during which the mechanism passes through the neutral position. Specifically, in accordance with the present construction, this reduction in torque is accomplished when a gear shift is made, by control means insuring the release of the brake 402 for the reaction member so that the converter is incapable at the time of shift of transmitting any appreciable torque from the primary member to the secondary member.

For operating a transmission of the kind shown in Fig. 9, an automatic control system operated by hydraulic pressure fluid is advantageously employed and in Fig. 15 there is schematically illustrated such a control system, which, while in certain respects similar to the control system shown in Fig. 8, performs numerous additional functions as will hereinafter more fully appear.

Referring now to Fig. 15, the control system illustrated embodies the following principal components; (1) a main control valve 474 which is in general similar to the main control valve 164 shown in Fig. 8 for controlling shift from hydraulic to direct drive and vice versa; (2) a regulator 478, hereinafter referred to as a ratio regulator, the action of which is responsive to the ratio between the speeds of the power input and output members of the transmission; (3) a speed responsive centrifugal governor 506 responsive to the speed of the power output or driven member of the transmission; (4) a throttle controlled overruling valve 472; (5) a hydraulic brake control valve 700; (6) a timing control valve 556; (7) a manually operated shift control for forward, neutral and reverse positions; and (8) an auxiliary hand brake release.

Pressure fluid for actuating the control system is supplied by means of a gear pump 460 driven from the rotating converter casing through gear 466 on the casing, intermediate gear 464 and gear 462 driving one of the pump gears. The pump inlet is indicated at 468 and the pump delivers operating fluid under pressure to the ratio regulator 478 through the passage 476, and to the control valve 474 and the overrule valve 472 through the conduit 470.

Referring to the figure, the construction of the ratio regulator 478 and the centrifugal governor 506 associated therewith will first be described. Regulator 478 comprises valve member 480 in the form of a spindle rotationally fixed but axially movable with respect to gear 462 by means of splines 482. Member 480 is provided with a groove 484 for distributing pressure fluid received from the pump through channel 476. Valve member 480 is further provided with a stroke limiting stop 488 at the end of the member opposite the end engaging gear 462.

A gear 492 rotatably mounted but axially fixed on the valve housing 479 is driven at a speed proportional to the speed of the secondary member of the converter through the medium of gear 498 of the reversing gear mechanism which meshes with a gear on the secondary member 28. Gear 492 has fixed to one of its faces a cup shaped retainer member 493, within which there is located a disc like member 490 one face of which bears against the adjacent face of gear 492. The member 490 is held in frictional contact with gear 492 by means of an annular member 496 which is pressed against the member 490 by means of the coil spring 494 compressed between member 496 and the retainer 493. The disc member 490 has a hub portion 489 engaging the valve spindle 480 through the medium of a helical thread 486 on the spindle and a corresponding groove in the hub. The stroke retainer or stop 488 for the spindle 480 is located in an annular recess 502 in the hub portion 489.

As will be evident from the drawing, the spindle 480 rotates at a speed proportional to the speed of the primary or driving member of the converter while the gear 492 rotates at a speed proportional to the speed of the secondary or driven member of the converter, and through the frictional contact between gear 492 and the member 490, the latter also tends to rotate at the same speed as gear 492. It will further be evident that if the member 490 is driven at higher speed than that of the gear 462, the action of the helical thread 486 on the spindle will tend to shift the rod axially to one limiting position determined by the stop 488, whereas when the member 490 rotates at a speed lower than that of gear 462 the action of the helical thread on the spindle will be the reverse and will operate to shift the valve axially to its other limit position determined by the stop 488. The manner in which the shifting of this valve effects operation of the control system will be described later.

The speed responsive governor associated with the ratio regulator 478 comprises a centrifugal governor indicated generally at 506 carried by and mounted to rotate with the gear 492. This governor comprises centrifugal weights 515 pivoted to move outwardly under the influence of centrifugal force and operative through the medium of levers 522 acting on collar 524 to axially move a sleeve valve 508 slideably mounted between the valve spindle 480 and the valve housing 479. The sleeve valve 508 is urged to the left as viewed in the figure by means of spring 527 and is urged to the right against the action of the spring by the centrifugal weights 515. The weights 515 are movable under the influence of centrifugal force between three different positions indicated at 516, 518, 520. In their inner position 516, outward movement of the weights under the influence of centrifugal force is resisted only by the force of spring 527 which continues to provide the only resistance until the weights reach the position 518. When the position 518 is reached the weights come into contact with leaf springs 529 carried by the gear member 492, these latter springs providing additional resistance to further outward movement of the weights.

From the position 518 to the position 520 the weights move outwardly against the combined resistance of springs 527 and 529 and when position 520 is reached, further outward movement of the weights is prevented by the fixed abutments 534 carried by the gear member 492. The manner in which the centrifugal governor acts to effect desired controls will be explained later.

The main control valve 474 comprises the spindle or rod 536 axially shiftable by means of a servomotor 532 having a piston 567 attached to the spindle 536 and biased toward a normal mid-position such as is shown in the drawing by means of the opposed coil springs 572 and 576. The extent to which spring 572 can expand is limited by the cup-like spring retainer 578 having a flange 582 engaging an abutment 584 in the servomotor housing, and similarlly the extent to which spring 576 can expand is limited by the retainer 580 having a flange 586 engaging an abutment 588 in the housing. Additionally, the position of the main control valve may be influenced by the shift control mechanism indicated generally at 664. In the position shown in the figure, the main control valve is positioned, as indicated at H, to provide hydraulic drive through the transmission. For direct drive the position of the control valve is above the position shown in which the flange or collar 633 on the valve is in the dotted line position indicated at D. Neutral position of the control valve is below the position shown, the flange 633 being in the position indicated at N.

The shift mechanism 664, indicated diagrammatically on the drawing, comprises a manually operated shift lever 666 pivoted at 667 and having an arm 672 carrying a roller 678 at its free end adapted to cooperate with the forked end 676 of lever 450 pivoted at 682 and engaging the ring member 448 of the reversing gear.

The free end of the lever 666 is provided with a cam member 668 having a cam surface 669 in the form of an arc with the pivot point 667 as a center and adjacent end cam surfaces 669a and 669b. The cam member 668 is adapted to engage one arm 662a of a bell crank lever 662 the other arm of which is located to engage one end of the spindle 536 of the main control valve 474. The operating end of the lever 666 is movable between a position 680 for forward drive (the position shown in the figure), a neutral position 681 and a position 683 for reverse. As will be observed from the drawing, when the shift lever is in the position for forward drive the ring member 448 is shifted so as to engage gear 451 on the secondary member of the transmission, while at the same time the cam member 68 has been moved out of engagement with the arm 662a of the lever 662 so as to permit the control valve 474 to assume its mid position, effecting hydraulic drive, insofar as the shift mechanism is concerned. As will be noted from the figure there is an appreciable clearance between the cam surface 669b and the lever arm 662a when the parts are set as shown. It will further be evident from the drawing that if the lever 666 is moved to the neutral position 681 the cam surface 669 will operate to engage the lever arm 662a and depress the lever to move the control valve downwardly to neutral position, the shift mechanism including the cam member providing a positive limit for preventing the control valve from moving to either hydraulic drive position or direct drive position, regardless of the positions that may be assumed by other elements of the system affecting operation of the main control valve. Also, it will be seen that if the control lever 666 is moved to position 683, arm 662a of lever 662 will move cam surface 669 to cam surface 669a. When the control lever is in the position 680, clearance is provided between arm 662a and the cam surface 669b to permit the control valve to move upwardly from the hydraulic position H to the direct drive position D without interference from the shift mechanism. On the other hand, the relation of the cam surface 669a to the lever arm 662a is such that these parts are in contact when the control lever is in position 683 and the control valve is in hydraulic position H, the shift mechanism thus providing an interlock preventing the control valve from moving to direct drive position when the mechanism is set for reverse drive.

As previously noted, the transmission of torque through the converter is substantially prevented when the shift mechanism is set for neutral position, by releasing the reaction brake 402 whenever the shift mechanism is in neutral. Further, the neutral condition with the reaction brake released is maintained until after engagement of a power transmitting drive to the tail shaft, the control system only thereafter being permitted to assume a condition in which the reaction brake is engaged so that torque can be transmitted through the converter. This is accomplished in the present embodiment by the relation of the arcuate arms 676 of the forked lever 450 to the pivot point 682 of this lever, the pivot point 667 of the control lever and the lengths of the lever arms between these pivot points. The arcuate arms 676 are separated at their inner ends by a notch into which roller 678 moves when the control lever is moved to its neutral position 681. When the control lever is moved from its neutral mid-position toward either forward or reverse position the initial movement causes movement of lever 450 to effect gear engaging movement of the ring member 448, while the lever arm 662a is still in engagement with the cam surface 669, and under this condition release of the reaction brake is insured. Only after either forward or reverse drive engagement has been established by the shifting movement of lever 450 does the lever arm 662a move out of contact with the cam surface 669, continued movement of the lever 666, after lever 450 has reached gear engaging position being permitted by the movement of the lever arm 672 along one or the other of the arcuate arms 676 on lever 450, the position and curvature of these arms when the lever 450 is in fully engaged forward or reverse position being such that the surfaces on which the roller 678 moves are circular arcs having a radius the center of which lies at the pivot point 667. By this arrangement, which in effect is a lost motion device, shift is effected from neutral in two steps, the first step effecting gear engagement while the reaction brake is released and the second step enabling the reaction brake to be engaged, but only after the gearing has been engaged. Additionally, the positioning of the arms 676 so that the surfaces engaging the roller 678 are circular arcs with the pivot point 667 as a center when the mechanism is in either forward or reverse position provides a positive lock for preventing lever 450 from being shifted from either gear position back to neutral by any force generated in the gearing which might tend to force it out of gear and into neutral.

The throttle controlled overruling valve 472 is operatively interposed between the ratio regulating valve mechanism and the servomotor 532 for operating the main control valve 474.

Valve 472 comprises a spindle type valve member urged to a mid-position such as is shown in the drawing by springs 613 and 615, the expansion of the former being limited by the retainer 617 engaging one side of an annular abutment 619 and the expansion of the latter spring being limited by the spring retainer 621 engaging the other side of the abutment 619. Flanges on the spring retainers engage a collar 623 on the valve spindle 614.

Valve spindle 614 is connected to the engine throttle control which in the example illustrated is in the form of the usual foot operated accelerator pedal 606, by means of a bell crank lever 610 and a link 608 having a lost motion slot 628 in which is located a roller or the like 626 at the free end of a suitable arm on the accelerator pedal. The accelerator pedal is urged to idling position (indicated in dotted lines at 612) by the usual throttle spring 625, the strength of which is such that it is able to overcome the resistance of spring 613 acting on the overruling valve spindle 614. The full line position of the accelerator 606 shown in the drawing may also correspond to idling position of the throttle through the interposition of suitable lost motion mechanism, or may represent a partially open condition of the throttle. The reason why it is necessary for spring 625 to be stronger than spring 613 is that when the accelerator is in the position shown in full lines in the drawing all of the lost motion afforded by the slot 628 is taken up so that when the accelerator is pushed to position 612 by spring 625 a certain amount of downward movement of the overrule valve 472 is effected against the resistance of spring 613, which must be compressed slightly from the neutral or mid-position shown in the drawing.

The position of the throttle pedal indicated in dotted lines at 624a corresponds to full throttle position, to which position the pedal can be moved by compressing only the spring 625. An auxiliary or "kick-down" spring 634 is held by a suitable retainer 635 and provides additional spring resistance to movement of the accelerator from the normal full throttle position 624a to a kick-down position indicated in dotted lines at 624b. Movement of the accelerator to the normal full throttle position operates through a bell crank lever 627 and rod 652 to open the engine throttle 644 through the medium of the lever arm 629. Between the bell crank lever 627 and rod 652 there is provided a spring loaded lost motion connection comprising a casing 656 enclosing a spring 658, the latter acting on a head 654 at one end of the rod 652 positioned within the casing 656. The strength of spring 658 is such that during movement of the pedal from idling to normal full throttle position spring 658 is not compressed, so that there is no relative movement or lost motion between the bell crank 627 and the rod 652. In normal full throttle position the upper end of the rod 652 engages a throttle stop 631 and upon further movement of the pedal from full throttle position 624a to the kick-down position 624b the spring 658 yields to permit such movement.

For reasons hereinafter explained, a solenoid is advantageously associated with the rod 652, being diagrammatically indicated by the armature 646 and coil 640, the arrangement being such that when the coil is energized the armature is pulled downwardly to move the throttle 644 toward closed position against the resistance of spring 658, the strength of the solenoid being sufficiently great to overcome the resistance of the spring. The solenoid is momentarily energized, by shifting movement of the control valve 474 in a manner and for reasons hereinafter explained, by means of a lever 635 pivoted at 636 and normally held in a mid-position such as is shown in the figure by means of springs 637. In its mid-position the lever permits contacts 638 controlling the circuit for energizing solenoid coil 640 to remain open, but as will be evident from the figure, movement of the collar 633 when the control valve 474 moves from hydraulic to direct drive position will cause the lever 635 to pivot to momentarily close the contacts 638 as the collar moves past the lever with what is in effect a snap action. In contrast with this, when the collar 633 moves downwardly from direct drive position of the control valve to hydraulic drive position it will pivot the lever 635 in the opposite direction so that the contacts 638 are not closed. Obviously, the movement of the collar 633 by movement of the control valve back and forth between hydraulic and neutral positions will have no effect on the lever 635 and contacts 638.

Hydraulic braking control for effecting hydraulic braking in addition to normal engine braking is provided for by the braking control valve 700, which is operative to control the brake 402 for the reaction member 48 of the converter.

As previously described, the brake 402 for the reaction member is engaged through the medium of a hydraulic brake mechanism having a brake cylinder 424 in which is located a piston actuating the rod 430 for moving the brake shoes into engaging position, as shown in Fig. 10. As seen in Fig. 15, the brake is engaged when pressure fluid is admitted to the brake cylinder 424 to move the actuating rod 430 upwardly and is released when pressure fluid is vented from the brake cylinder.

Valve 700 forms a part of the means for controlling the reaction brake. This valve comprises a spindle type valve member 702 slidable in a suitable housing and engaging at one end one arm of a bell crank lever 706 which by means of a link 704 is connected to an arm of a vehicle brake pedal 535 for actuating the wheel brakes of the vehicle in which the transmission is installed. The brake pedal 535 is retracted by the usual spring 708. The valve spindle 702 is urged to the left from the position shown in Fig. 15 by spring 712 acting on a cup shaped retainer 710 having a flange at its open end movable for a limited distance within an annular recess 714 in the wall of the valve housing. Spring 708 is stronger than spring 712 so that when foot pressure is removed from the brake pedal and the latter is retracted by spring 708, spring 712 will be compressed to move the valve spindle 702 to the position shown in the drawing, movement of the valve spindle further to the right than the position shown being prevented by the spring retainer cup 710. The connection between the valve spindle 702 and the lever 706 is in the nature of a lost motion abutment connection, it being evident that upon depression of the brake pedal 535 the lever 706 can be moved away from the spindle 702, in which case spring 710 can act to move the spindle 702 to the left from the position shown until the spring retainer reaches the left hand limit position determined by the length of the recess 714.

For reasons hereinafter appearing, it is advantageous to provide a timing valve associated with the braking control valve. This valve is shown at 556 and comprises a spindle type valve member 557 including a piston 559 movable in response to pressure fluid admitted to the valve chamber 561. The valve member 557 is urged toward the right to the position shown in Fig. 15 by means of spring 563.

Advantageously, an automatic release for the hand brake of a vehicle is provided in order to avoid attempts at starting a vehicle with the wheel brakes set, through inadvertence or carelessness on the part of the driver, and such an arrangement is shown generally at 716, comprising a pivoted ratchet 718 adapted to be engaged by pawl 720 on the usual hand brake lever 722 and movable out of engagement with the pawl by means of a servo-motor 724 having a spring loaded piston 726 located in a chamber 728 to which pressure fluid for effecting release of the brake may be admitted.

Referring again to the main control valve 474, the valve spindle 536 is formed with five spaced piston portions 537, 539, 541, 543, and 545 separated by the intervening grooves 538, 540, 542, and 544 which provide means for controlling the flow of pressure fluid through the several conduits terminating in ports in the valve housing.

The manner in which the main control valve operates in its several positions to provide for hydraulic and direct drive of the transmission and a neutral position, is as follows.

As previously noted, the valve is set for hydraulic drive in the position shown in the figure. In this position pressure fluid from the pump is conducted through conduit 470 and branch 470b to the control valve, the recess 538 placing conduit 470b in communication with conduit 548 so that pressure fluid is delivered through the channel 186 in the driven member of the converter to the working chamber of the converter and is also admitted to the chamber containing the plates of the direct drive clutch 72 so that the clutch plates are separated and the clutch disengaged, the pressure of the operating fluid being sufficient to overcome the engaging pressure of the springs 400. Pressure fluid flows past the restriction 198 and is delivered through the bore 204 in the driven member of the converter and branch 550a of the conduit 550 to the channel formed by the groove 540 in the control valve, from which the fluid is discharged to the sump through the relief channel 562. The operating fluid at relatively low pressure in channel 550 flows through branch 550b to the pressure chamber 561 of the timing valve 556. The low pressure fluid is however unable to overcome the resistance of spring 563 so that the timing valve remains in the position shown in the figure.

Pressure fluid also flows through branch 470a of the supply conduit 470 to the channel 542 in the control valve from which the fluid is delivered through conduit 552 to the pressure chamber 424 of the reaction brake 402. Since the timing valve 556 is in the position shown, as is also the braking valve 700, pressure in chamber 424 is maintained due to the fact that the conduit 553 from the chamber, which is in communication with the vent conduit 558a by way of the valve 700, is closed by the timing valve. Thus in hydraulic drive position the working chamber of the converter is maintained under relatively high fluid pressure, the clutch 72 is disengaged, and the reaction member is locked against rotation by the reaction brake, to provide the conditions required for hydraulic drive.

If now, the control valve is shifted to the direct drive position, high pressure fluid flows from branch 470b of the supply conduit to the branch conduit 550a and thence through the bore 204 to the piston or operating member of the direct drive clutch 72 to cause engagement of the latter. At the same time conduit 548 is placed in communication by the control valve with the discharge conduit 564 controlled by the spring loaded check valve 556, thus relieving the pressure in the working chamber of the converter to a pre-determined minimum pressure which is maintained by leakage across the restriction 198 from the high pressure fluid supply in the bore 204. For direct drive it is of course necessary that the reaction member of the converter be released so that it may rotate together with the pump and turbine members to eliminate hydraulic resistance during direct drive operation. When the control valve moves to direct drive position the piston part 543 of the valve moves to a position where it covers the end of the conduit 552 leading to the reaction brake cylinder 424 so that pressure is maintained in the cylinder when the shift is made, the reaction member thus not being immediately released as the direct drive clutch is engaged. It takes an appreciable time for the pressure fluid to build up to full pressure after being admitted to the pressure chamber of the direct drive clutch and until that pressure is built up to a value which results in engagement of the direct drive clutch the timing valve 556 remains in the position shown in the drawing, which prevents venting of the pressure chamber of the reaction brake clutch. However, when pressure is built up sufficiently to insure that the clutch 72 has been engaged the pressure overcomes the resistance of spring 563 to move the valve member 557 of the timing valve to the right so that the brake chamber is vented through the conduits 553, 558a, and 558b. Thus by delaying the release of the reaction member of the hydraulic converter the converter continues to function as a power transmitting device until full engagement of the direct drive clutch has been effected so that there is provided in effect a power shift, that is, a shift from one drive to another without interruption of the transmission of power from the driving to the driven member of the transmission.

When the control valve is moved to the neutral position the brake cylinder 424 is vented due to the connection of the conduit 552 with the vent conduit 562 by way of the recess 540 in the control valve. At the same time the supply conduit branch 470a is closed by the valve piston 541 and the supply conduit branch 470b is brought into communication with the conduit 548 through the valve recess 538 so that pressure fluid is admitted to the hydraulic working chamber and the direct drive clutch 72 is disengaged.

For numerous reasons it is desirable that when the main control valve is set in neutral position the reaction brake be released and in this connectiton the hydraulic braking valve 700 must be considered. When the main control valve is set in neutral position the brake chamber 424, as previously explained, is vented through conduits 552 and 562. However, conduits 565 and 553 provide communication for pressure fluid between the control valve and the brake pressure chamber by way of the brake control valve 700 and as will be observed from the drawing, if the brake pedal is depressed so that the brake control valve spindle 702 moves to the left, pressure fluid would be admitted to the brake chamber by way of these conduits. With the main control valve in neutral position this is however prevented because of the inlet of conduit 565 being blocked by the piston part 543 of the control valve. Consequently, regardless of the position of the brake pedal and of the valve 700 controlled by the brake pedal, it is impossible to engage the reaction brake when the control valve is in neutral position. When the main control valve is in hydraulic drive position, the vent conduit 558b is closed by the timing valve 556 as previously explained and normally communication between conduits 553 and 565 is cut off by the brake valve spindle 702, pressure being maintained in the brake cylinder by fluid admitted through conduit 552 so that the reaction member is held against rotation, a condition necessary for hydraulic drive. If when in hydraulic drive the brake pedal is depressed so that the brake valve moves to the left to place conduits 553 and 565 in communication, this has no effect and the reaction brake cylinder is maintained under pressure because of the fact that the end of conduit 565 communicating with the brake control valve 700 is in communication in the hydraulic position of the main control valve with the valve recess 544, which in this valve position constitutes a closed chamber between the main control valve piston parts 543 and 545. Thus when the main control valve is set for hydraulic drive the position of the brake pedal and its associated brake control valve is of no consequence.

When the main control valve is set for direct drive the supply conduit 552 leading to the brake chamber 424 is blocked off by the valve piston part 543 and as previously noted the chamber 424 is vented through conduits 553, 558a and 558b, the timing valve 556 being to the left of the position shown in the drawing. If under these conditions the brake pedal is depressed to permit the valve member 702 of the braking valve 700 to move to the left, conduits 553 and 565 are placed in communication and communication is cut off from the conduit 553 to the vent conduit 558a. Since in the direct drive position of the control valve the conduit 565 is placed in communication with the source of pressure fluid by way of the conduit 470a via the valve recess 544, the reaction brake will be engaged to produce the desired hydraulic braking effect in addition to the engine braking effect obtained through the direct drive connection between the engine and the vehicle wheels. Advantageously, the linkage connecting the brake pedal with the wheel brakes (or brake cylinder in the case of hydraulic brakes) may be made such that depression of the brake pedal to an extent sufficient to enable the hydraulic braking effect to be obtained is made without effecting engagement of the wheel brakes, the final wheel braking being effected by further depression of the brake pedal after the valve 702 has reached its left hand limiting position, so that the lever 706 moves away from the end of the valve member 702.

The manner in which the main control valve is automatically shifted between hydraulic and direct drive positions and the manner in which such automatic shift may be overruled by the operator when such overrule is permissible will now be described. Referring again to the ratio regulator 478 and assuming that the direction of rotation of the converter is such that the gear 462 rotates the valve spindle 480 in the direction indicated by arrow 500, that is, clockwise as viewed from the left of Fig. 15, and further assuming that the vehicle is standing still and the shift control 664 has been moved from neutral to forward drive position, the gear member 492 carrying the centrifugal governor is stationary and the centrifugal weights 515 are in their inner position 516. Also, under these conditions the control member 490 which frictionally engages the gear 492 is in frictional sliding relation with gear 492, the frictional contact between these parts tending to hold the member 490 stationary. The frictional drag on the part 490 results in the valve spindle 480 being shifted to its extreme right hand position, as shown in the drawing, the valve spindle rotating in that position after having reached its axial end position and causing to rotate with it the member 490, which is in frictional slipping engagement with the gear 492. If it is further assumed that the throttle pedal 606 is in the position shown in full lines in the drawing the following condition exists. Pressure fluid from conduit 476 leading to the regulator valve is blocked off by the valve spindle 480 and consequently pressure fluid is unable to reach the lower pressure chamber of the main control valve servomotor 532 through conduits 504 and 568. Instead, the lower pressure chamber is vented through conduit 568, recess 620 in the throttle controlled overrule valve 472, conduit 504, ports 514 and 512 in the sleeve valve 508 and vent passage 622. The upper pressure chamber of the servomotor is likewise vented through the conduit 570 and vent conduit 618, which are placed in communication by way of the valve recess 616 in valve 472. Thus, under the assumed conditions, the servomotor 532 positions the control valve in hydraulic drive position, the valve being enabled to assume this position because of the manual shift control having been shifted by the operator from neutral to forward drive position. The vehicle is thus ready to be started, with the transmission set for hydraulic drive.

Before considering the action which occurs when the vehicle is started it is best to consider the positions of the parts when the throttle pedal is in fully retracted idling position as indicated at 612. In this position of the throttle, the overrule valve 472 is moved downwardly to a position such that the vent passage 618 for the upper chamber of the servomotor is closed and the channel 570 is placed in communication with the branch 470c of the pressure conduit 470. This downward movement of the throttle control valve does not, however, close communication between conduits 568 and 504, so that the lower pressure chamber of the servomotor remains vented. Under this condition the control valve is moved downwardly by the servomotor to the neutral position which as previously explained results in the reaction brake being released. Consequently, when the throttle pedal is in its normal idling position 612 a minimum amount of torque is transmitted to the driven member of the converter, which provides two advantageous features. If it is assumed that the manual shift is in neutral position, the released reaction brake resulting from the control valve being in its neutral position enables the manual shift to be moved from neutral position to engage either forward or reverse drive under conditions of minimum torque transmission from the converter. Also, after either forward or reverse drive has been engaged the released condition of the reaction member of the converter resulting from the control valve being in its neutral position minimizes the amount of torque transmitted to the vehicle wheels and thus substantially eliminates any tendency of the vehicle to "creep" even though the adjustment or condition of the engine results in the engine idling speed being higher than normal. If we again assume the manual shift to be set for forward drive and the throttle pedal to be depressed to start the vehicle, the first movement of the pedal from position 612 to the full line position shown in the figure results in the control valve being shifted from neutral to hydraulic position. As the throttle pedal is further depressed and the vehicle is accelerated the first action which takes place is for the weights 515 of the centrifugal governor to move outwardly against the action of spring 527 alone. Assuming for purposes of illustration that the transmission is installed in a conventional passenger automobile the strength of the spring 527 is so related to the mass of the weights that the latter are moved out to the position 518, where they meet the further resistance of the leaf springs 529, at a car speed in the neighborhood of 10 to 15 miles per hour, say 12 miles per hour. At such a car speed, in hydraulic drive, the speed of the gear 492 of the ratio regulator will still be very materially below the speed of the gear 462 connected to the primary member of the converter and rotating the valve spindle 480 of the regulator. Consequently, in this speed range the friction member 490 still acts as a friction drag on the regulator valve spindle and maintains it in the position shown in the drawing. Meanwhile the sleeve valve 508 has been shifted slightly to the right of the position shown by movement of the centrifugal weights to position 518. This limited movement of the sleeve valve 508 to the right is not sufficient to move the ports 514 and 512 out of communication with their respective conduits so that the lower pressure cylinder of the control valve servomotor remains vented and the control valve consequently cannot be moved to direct drive position, it being noted that depression of the throttle pedal from the full line position toward position 624a does not act to move the overrule valve 472 from its mid-position established by spring 613 and 615 because of the lost motion connection 628 in the valve linkage.

As the driven member of the hydraulic transmission continues to accelerate so as to increase the value of the ratio of the speed of the driven member relative to that of the driving member, which ratio will be hereinafter referred to as $n_2/n_1$, the ratio of torque multiplication progressively decreases until at a certain ratio $n_2/n_1$ the output torque is no greater than the input torque. If the ratio $n_2/n_1$ increases beyond this point, which is herein referred to as the "shift" point, the output torque becomes less than the input torque, a condition which should at all times be avoided since the drive is less effective than a direct drive and is the result of the converter operating at an efficiency so low that excessive heating of the converter results. Depending upon design features the shift point of a converter for a normal passenger car may be at a ratio $n_2/n_1$ of the neighborhood of 0.7 and when the shift point is reached it is desirable that the transmission be shifted automatically to direct drive, regardless of the will of the operator and independently of the absolute speed of the driven member of the transmission which is also a measure of the speed of the vehicle. Consequently, the gearing for driving the gear 462 of the regulator from the driving or primary member of the converter and the gearing for driving gear 492 from the driven or secondary member of the converter is selected so that when the speed of the secondary member is for example 0.7 of the speed of the driving member the speed of gear 492 is the same as the speed of gear 462, and if this speed ratio is exceeded the speed of gear 492 exceeds the speed of 462. In other words, the gearing is laid out so that although both gear 462 and gear 492 are always rotated in the same direction, the speeds of these two gears cross at the shift point speed ratio between the driving and driven members, which for purposes of example has been assumed to be 0.7.

As soon as the speeds of the two gears 462 and 492 cross, so that gear 492 rotates faster than gear 462, the element 496 ceases to provide a friction drag on the valve spindle 480 and applies a friction driving force to the valve. The result of this is that the thread 486 and its cooperating groove in the hub of the member 490 co-act to shift the valve 480 from its right hand position shown in the drawing to its left hand position, the axial travel of the valve being limited by the length of the recess 502 in the hub of the member 490. When this shift is effected, and assuming the sleeve valve 508 to be moved to the right to a position corresponding to the mid-position 518 of the centrifugal weights of the speed governor, the following action takes place. The vent channel 622 is closed by the valve spindle 480 and conduit 504, which is still in communication with the lower chamber of the control valve servomotor 532 by way of valve 472 and conduit 568, is placed in communication with the source of operating pressure fluid by way of channel 476, valve ports 510 and 514 in the sleeve valve and the channel 484 in the valve spindle 480. Since the upper chamber of the servomotor is vented through channels 570 and 618, this operates to cause the servomotor to shift the control valve upwardly from hydraulic to direct drive position and cause direct drive to be established in the manner heretofore described.

As previously explained, the speed governor operates to prevent the control valve from being shifted to direct drive position at any vehicle speed below a pre-determined speed which for example has been considered to be 12 miles per hour, so that below this speed only hydraulic drive or neutral can be provided, depending upon the throttle position. Conversely, there is a certain high speed range of operation of the vehicle, the lower limit of which may for example be 60 miles per hour, where it is substantially essential that the transmission remain in direct drive, regardless of the will of the operator. Direct drive in the high speed range is insured by the action of the centrifugal governor, operating as follows. As previously explained, when the centrifugal weights 515 reach the position 518 where they come into contact with the leaf springs 529 (at the upper limit of the low speed range of operation of the vehicle assumed to be 12 miles per hour) further outward movement of the weights is prevented by springs 529 the strength of which is materially greater than the strength of the spring 527 providing the resistance to movement of the weights from position 516 to position 518. As the vehicle speed increases above the assumed 12 miles per hour speed the centrifugal force developed by the weights 515 increases but the strength of the springs 529 is such that no further outward movement of the weights is permitted until a pre-determined vehicle speed constituting the lower limit of the high speed range is reached, for example 60 miles per hour. When this speed is reached, the centrifugal force developed by the weights overcomes the combined resistance of springs 527 and 529 and the weights move outwardly. Once such movement is started, the increasing radius of the weights increases the centrifugal force at a rate greater than the increasing resistance of the springs, so the weights move substantially immediately from position 518 to 520 when the 60 miles per hour speed is reached, and the weights remain in their outer limit position 520 as long as the 60 mile per hour speed is maintained or exceeded. If the speed falls a pre-determined small amount below 60 miles per hour the weights then immediately move back to position 518 or a position intermediate 518 and 516, depending upon the car speed if the latter is in the lower speed range.

When the weights are in position 520, which position they always assume at 60 miles per hour car speed or higher the sleeve valve 508 is shifted to its extreme right hand position, in which communication is still maintained between the pressure fluid supply conduit 476 and the lower pressure chamber of the servomotor via ports 510 and 514 in the sleeve valve, recess 484 in the regulator valve 480, conduit 504, recess 620 in the overrule valve 472, and conduit 568 in the servomotor. Thus pressure is maintained in the lower chamber of the servomotor to keep the control valve in direct drive position, and this is maintained regardless of the axial position of the regulator valve spindle 480.

Additionally, however, the movement to the extreme right hand position of the valve sleeve 508 places the pressure fluid supply conduit 476 in communication with a conduit 628 by way of a recess 630 in the sleeve valve, the recess 630 in the right hand position of the sleeve valve being moved out of communication with the vent passage 632 with which the recess is in communication in either the mid-position of the sleeve valve or its left hand position. The reason for establishing this additional supply of pressure fluid to the throttled controlled overrule valve 472 will subsequently be explained.

From the foregoing it will thus be apparent that the ratio regulator valve and the associated speed responsive valve operate to determine two operating conditions beyond the control of the operator of the vehicle. The first is a low speed range in which hydraulic drive is always insured and the second is a high speed range in which direct drive is always insured. Between these speed ranges there is an intermediate speed range which under the assumptions which have been made has a lower limit of 12 miles per hour and an upper limit of 60 miles per hour and in this range the vehicle drive, either hydraulic or direct, is selectively under the control of the vehicle operator so that if within this speed range the drive is at any given moment in direct drive the operator may at will return to hydraulic drive in order to obtain greater accelerating power either for hill climbing or for quick acceleration to pass another vehicle. If we assume that the vehicle is operating in the intermediate speed range and in direct drive the operator can return to hydraulic drive by depressing the throttle pedal to the kick-down position 624b. In order to reach this position it is necessary first that the engine throttle be fully opened since the pedal must pass through position 624a so that the kick-down position is reached under full throttle condition. Movement of the pedal to full throttle position operates to take up all the lost motion in connection 623 and movement to the kick-down position then operates to lift the overrule valve 472 from the position shown in the drawing to its overrule position. Lifting of the valve 472 to the overrule position closes communication between conduits 504 and 568 through the valve recess 620, so that the supply of pressure fluid is cut off from the lower pressure chamber of the control valve servomotor. Such movement also establishes connection between conduit 568 and conduit 628, the latter being vented through conduit 632 via the recess 630 in the sleeve valve 508. The latter conduits are in communication under the assumed conditions, that is, vehicle speed being in the intermediate speed range, since in this range the centrifugal governor weights are in a position not further out than position 518 and the sleeve valve is consequently at midposition or to the left of mid-position so that conduit 628 is vented.

Now if we assume that the vehicle is in its upper speed range and the operator attempts to return to hydraulic drive by moving the throttle pedal to kick-down position, return to hydraulic drive is prevented by the fact that although the movement to its upper position of the overrule valve 472 cuts off the supply of pressure fluid through conduit 504 to the lower chamber of the servomotor, the latter chamber is not vented. Instead, due to the fact that the vehicle is in its high speed range and the sleeve valve 508 is in its right hand position, communication between conduit 628 (which under the assumed overrule condition is now in communication through valve 472 with conduit 568) and the vent 632 is cut off by the sleeve valve 508 and pressure in the lower chamber of the servomotor is maintained due to the fact that the pressure supply conduit 476 is in communication via the sleeve valve recess 630 with conduit 628. The result is that in the high speed range of operation, movement of the overrule valve to its upper or overrule position is not effective to relieve pressure from the lower chamber of the servomotor, so that the control valve remains in its direct drive position. In this connection it is to be noted that the overrule in the high speed range is rendered ineffective regardless of the axial position of the ratio regulator valve 480.

If we now assume that the vehicle has been accelerated from rest to some intermediate speed for example 25 miles per hour in hydraulic drive, the engine speed having been maintained sufficiently high so that the converter shift point has not been reached, and the operator desires to shift to direct drive, this is accomplished at will merely by momentarily relieving the throttle of foot pressure sufficiently to decelerate the engine to a speed such that the shift point ratio between the driving and driven members of the converter is reached at the then existing car speed. When this is done the regulator valve spindle 480 is moved from its right hand position corresponding to hydraulic drive to its left hand position, due to the crossing of the speeds of the gears 462 and 492. When this occurs the pressure supply conduit 476 is placed in communication with the conduit 504, so that pressure fluid is admitted via the recess 620 of the overrule valve 472 and conduit 548 to the lower pressure chamber of the servomotor to shift the control valve to direct drive position.

If upon desiring to shift from hydraulic drive to direct drive in the intermediate speed range the operator relieves the throttle pedal of all foot pressure so that the pedal assumes the position 612, the action is slightly different than that just described but is still effective to cause shift to direct drive. If the pedal is allowed to assume position 612 it moves the overrule valve 472 downwardly, so that while pressure fluid is admitted to the lower chamber of the control valve servomotor via conduits 504 and 568, the upper chamber is no longer vented via conduits 570 and 618, the latter being closed by the downward movement of the overrule valve. However, the downward movement of the overrule valve places the conduit 570 in communication with the pressure supply conduit 470c so that pressure fluid is admitted to the upper chamber of the servomotor as well as to the lower chamber. The unit pressures in these chambers are thus equal but the effective area acting on the lower face of the piston 567 is larger than the effective area acting on its upper face, the former area being equal to that of the piston and the latter area being equal the area of the piston less the area of the piston portion 545 of the control valve member. The strength of the spring 572 is such that the difference in total pressure on the two sides of the piston is sufficient to cause the spring to be compressed, so that the control valve is moved to direct drive position. Obviously as soon as the throttle pedal is again depressed from the idling position 612, the upper chamber of the servomotor is again cut off from the source of pressure fluid and again vented through the vent conduit 618. Thus the operator is enabled, whenever the vehicle is in the intermediate speed range, to shift from hydraulic to direct drive or vice versa, by relieving throttle pedal pressure or by depressing the throttle pedal to kick-down position as the case may be.

When the control system operates to arbitrarily shift from hydraulic drive to direct drive under full throttle conditions, due to the fact that the shift point has been reached and the ratio regulator valve arbitrarily causes shift to direct drive, this occurs at a time when there is substantial speed differential between the engine and the driven shaft. If this shift is made under full throttle conditions, an appreciable surge may result when the direct drive clutch engages to synchronize the driving and driven speeds and in order to minimize or eliminate the surge the solenoid control 640 is advantageously provided so that when the control valve shifts from hydraulic to direct drive position the solenoid actuating circuit is momentarily closed to momentarily move the throttle away from full throttle position, regardless of the position of the throttle pedal 606. Instead of energizing a solenoid actuating circuit for momentarily closing the engine throttle the contacts 638 may be embodied in a circuit operative to ground or short circuit the ignition system of a gasoline engine or render inoperative the fuel pump of a fuel injection system so as to momentarily interrupt the flow of power from the engine at the instant the shift is made.

The manner in which the hand brake release is effected is as follows. Whenever the main control wave 474 is in neutral position the pressure chamber 728 is vented via the recess 540 in the valve and the vent conduit 562. As soon as the main control valve shifts to hydraulic drive position fluid is admitted to the chamber 728 from supply conduit 470a via the valve recess 542 and conduit 730. This acts to release the ratchet so that the hand brake is automatically released as soon as the transmission is set for hydraulic drive, assuming the engine to be running so as to produce operating fluid under pressure. If the main control valve shifts to direct drive position, the conduit 730 is blocked by the piston part 543 of the control valve so that the brake ratchet may remain released due to pressure fluid trapped in chamber 728 but this is of no consequence since under no normal conditions should it ever be desirable to have the hand brake locked in braking position when in direct drive.

While for purposes of describing the control system the schematic drawing of Fig. 15 shows the several control valves separated and connected by external conduits, it will be evident from Figs. 9 to 12a inclusive that all of the several control valves, the speed governor, the servomotor for actuating the main control valve and the pressure cylinder for controlling the reaction brake valve may all be incorporated in a unitary housing 479 which, as appears more clearly from Figs. 10 and 12, is mounted as a unit in the stationary housing 10. By incorporating the several valves and other elements of the control system as well as the various conduits interconnecting them in a unitary body, it is relatively easy to make and maintain proper adjustment between the interrelated parts and such construction also affords very ready means for servicing the control system since the control unit can be removed as such from the casing for adjustment, repair, or replacement by a substitute unit without disturbing other elements of the transmission.

In the embodiment of apparatus just described the control system is actuated throughout by hydraulic pressure fluid. In some instances it may be desirable to utilize electrically actuated control in place of fluid pressure actuated control as to certain of the control elements in order to avoid the use of mechanical linkage between the widely separated assemblies such as the main control valve and the operator controlled elements such as the shift control, the throttle pedal, the foot brake pedal and the hand brake.

In Fig. 15a there is schematically illustrated a system which functions in the same manner as that shown in Fig. 15, like parts being designated by like reference numerals, the difference in the systems being that in the present instance certain of the hydraulic actuated elements are replaced by electrically actuated parts.

Referring now to Fig. 15a, the main control valve 474 is provided with a piston-like armature 567a acted on by opposing springs 572 and 576. Above the armature 567a there is provided a solenoid coil 732 and below the armature there is provided a solenoid coil 734, the former coil when energized acting to shift the control valve from the hydraulic drive position shown in the figure to direct drive position and the latter acting to shift the valve to neutral position  Coil 732 forms a part of circuit 736 in which is also located the pair of contacts 738. Coil 734 forms part of a circuit 740 in which is also located a first pair of contact points 742 and a second pair of contact points 744 and a third pair of contact points 746, these contact points and the coil being arranged in series in the circuit.

Coil 734 is tapped at point 748 by circuit 750 in which is located in series a first pair of contact points 752 and a second pair of contact points 754. The solenoid coil 640 associated with the throttle control forms part of a circuit 756 in which is also located the pair of contact points 638. The circuit 756 in which the contacts 746 are located also includes a pair of contacts 758 and an additional pair of contacts 760, this circuit being connected into the circuit 736 so as to include the solenoid coil 732 in the circuit.

The braking control valve 702 is provided with an armature 702a associated with a solenoid coil 762 forming a part of a circuit 764 in which is also located a pair of contact points 766.

The hand brake ratchet is controlled by an armature 768 associated with the solenoid coil 770 in circuit 772 which also includes a pair of contact points 774.

Referring now to the ratio regulator 478 and the associated centrifugal governor 506, the several pairs of contacts controlled by these devices are actuated as follows. The ratio regulator spindle 480 is provided with a cam part 480a located so that when the ratio regulator spindle is in its right hand (hydraulic drive) position, contacts 758 are open while in the left hand position of the spindle these contacts are closed by the action of the cam via the rod 579. The sleeve part 508 controlled by the movement of the centrifugal governor weights 515 is provided with a cam part 508a so located that when the weights are in the position 518 as shown in the drawing, contacts 760 are closed by the action of the cam 508a and pin 761 while contacts 738 and 742 are open. Upon movement of the sleeve 508 to the right to a position corresponding to the outer position 520 of the centrifugal weights, contacts 738 are closed by the cam and pin 739, contacts 742 and 760 then being open. Movement of the sleeve to the left to a position corresponding to the inner position 516 of the centrifugal weights closes contacts 742 through the medium of pin 743, contacts 738 and 760 then being opened. The throttle pedal control is arranged so that when the pedal is in the fully retracted idling position 612, contacts 744 are closed by the bell crank 776 which is engaged by the head on the link 608 Contacts 746 are normally closed and remain closed in all positions of the throttle pedal except the kick-down position 624b in which position of the pedal they are opened by the head on the link 608.

The contacts 766 in the braking control circuit 764 are open when the brake pedal 535 is in fully retracted or off position and closed as soon as the pedal is depressed slightly from its off position.

The contacts 752 and 754 in the circuit 750 are normally closed, with both sets of contacts being closed when the shift control lever 666 is in neutral position, contacts 752 being opened when the shift lever is moved to forward drive position as shown in the drawing and contacts 754 being opened when the shift is moved to reverse position.

The contacts 774 in the hand brake circuit 772 are closed when pressure fluid is admitted to the cylinder 728 and opened when pressure is relieved from the cylinder.

The functions of the main control valve 474, the hydraulic braking control valve 700, and the timing valve 556 in their several positions are the same as in the arrangement shown in Fig. 15, and the various circuits control these valves as follows. Whenever the shift lever 666 is in neutral position so that the circuit 750 is closed, current flows through the portion of the solenoid coil 734 between the tap 748 and the ground to pull the control valve downwardly to neutral position Due to the high rate of current flow through the comparatively short coil the control valve will always be moved to neutral position regardless of whether coil 732 is energized or not. The position of the parts shown in the drawing is for hydraulic drive with the shift control set for forward drive. In this position neither of the solenoid coils 732 or 734 is energized, since both circuits 736 and 740 are broken due to the fact that contacts 744 and 742 are both open. Further, the coil 732 is not energized by way of circuits 736 and 756 because contacts 742 are open. If it is now assumed that the speed of the vehicle increases to the high speed range where direct dirve is automatically and arbitrarily effected, the sleeve 508 will have been shifted to the right to close contacts 738 and energize circuit 736, thus causing coil 732 to move the control valve to direct drive position. The assumed condition which energizes circuit 736 also results in the ratio regulator 480 moving to its left hand position to close the contacts 758 so that in addition to circuit 736 being energized, circuit 756 which constitutes the overrule circuit, is also energized. If under these conditions the operator attempts to kick-down to hydraulic drive by depressing the throttle to kick-down position to open contacts 746 in circuit 756, the kick-down is not effected since coil 732 remains energized through circuit 736. If, however, the vehicle is in its intermediate speed range and is in direct drive with contact 758 closed by the ratio regulator 480 and the contacts 760 closed by the sleeve 508, the direct drive condition is maintained only by circuit 756, circuit 736 being opened at 738. Under these conditions if kick-down to hydraulic drive is attempted the kick-down movement is effective because of the fact that opening of contacts 746 de-energizes circuit 756 which is the only circuit holding the control valve in direct drive position. On the other hand if the vehicle is in its intermediate speed range in hydraulic drive and it is desired to shift to direct drive, release of the throttle pedal to decelerate the engine and cause the primary and secondary speeds to cross results in the shifting of the ration regulator member 480 to the left to close contacts 758, and under the assumed conditions contacts 760 being closed by the sleeve 508, coil 732 is energized to produce direct drive via circuit 756 and the portion of circuit 756 which includes the solenoid coil.

Hydraulic drive in the low speed range of the vehicle is insured by the fact that in this range the sleeve 508 is in its left hand position so that both contacts 738 and 760 are open and it is thus impossible to energize the coil 732 via either of the circuits 736 or 756.

When the throttle pedal is fully released to position 612 and the vehicle is either standing still or moving at a very low rate of speed, the main control valve is moved to neutral position due to the closing of the contacts 744 and the energizing of circuit 740 including the coil 734, this completion of the circuit being made possible because of the fact that under the assumed conditions sleeve 508 is in its left hand position and contacts 742 in circuit 740 are also closed. Movement of the throttle pedal to position 612 at intermediate or high car speeds will not move the control valve to neutral since under the latter two conditions contacts 742 will be open.

The operation of the flange 633 on the control valve 474 to provide momentary decrease in the input power when a power shift is made from hydraulic to direct drive, through the medium of contacts 638 and solenoid coil 640, is the same as previously described.

From the foregoing it will be evident that the combined hydraulic-electric control system of the present embodiment provides the same functional features and advantages as the all hydraulic control system shown in Fig. 15.

While for numerous practical reasons, including stability of adjustment, a control system of the kind under discussion which embodies a ratio regulator is to be preferred, the desired operating characteristics can be secured by other arrangements which make unnecessary a ratio regulator of the kind previously described.

Such a system is shown in Fig. 15b, in which the main control valve, the hydraulic braking valve, and the timing valve are controlled by circuits similar to those previously described in connection with Fig. 15a, these parts being designated by corresponding reference numerals.

In the present instance however, the regulator spindle 480 which is axially shiftable to determine direct or hydraulic drive is not rotated by the gear 462, the latter serving merely to actuate the pressure fluid supply pump. Instead, the centrifugal governor embodying weights 515 and carried by the gear 492 connected to the secondary or driven member of the transmission acts directly on the spindle 480 against the resistance of spring 527 located between a suitable spring retaining collar on the spindle 480 and a fixed abutment provided by the housing 479. Spindle 480 carries a cam 480a at one end and spaced therefrom a collar 480b, while at the other end it is made in sleeve form to slidably receive a plunger 480c to which is attached a spring rod providing an abutment between which and the plunger there is located the prestressed spring 529 corresponding in function to the leaf springs 529 in the previously described embodiments.

Additionally there is pivoted in alignment with the spindle 480 a cam 778 having a cam surface 780, which, when the throttle pedal is in the full line position shown, is spaced from the end of the plunger 480c to provide a certain amount of clearance. The form of the cam surface 780 is such that as the cam is rotated counter-clockwise it moves the plunger to the left as seen in the drawing after the clearance has been taken up. Cam 778 is connected by means of a suitable arm 782 and link 784 with arm 606a on the throttle pedal, the connection being such that when the pedal is depressed the cam is turned counter-clockwise.

Additionally, there is provided an overcenter switch member indicated generally at 786 for controlling the circuit contacts 738. In the embodiment shown, this comprises a pivoted lever member 788 having an arm 790 located to be engaged by the collar 480b on spindle 480, an arm 792 located to close the contacts 738 and an arm 794 located to be actuated by the armature 796 of a solenoid having a coil 798. The member 788 is held in either one of its two overcenter positions by means of the spring 800 and as will be evident from the drawing the device is maintained by the spring either in the position shown in the drawing, in which the contacts 738 are open, or an opposite overcenter position in which the contacts 738 are closed.

The circuits indicated in this embodiment for actuating the main control valve are similar to those shown in Fig. 15a, comprising a circuit 736 which when energized moves the control valve to direct drive position and a circuit 740 which when energized moves the main control valve to the neutral position. In the present instance circuit 740 includes two sets of contact points 742 and 742a which are opened and closed together through the medium of the rod 579, depending upon the position of the spindle cam 480a.

Considering now the manner in which this arrangement functions, the parts as shown in the drawing correspond to a standing condition of the vehicle with the shift mechanism set for forward drive and with the throttle pedal only slightly depressed from its full idling position 612. In this position the main control valve 474 is in hydraulic drive position, since neither circuit 736 or circuit 740 is energized. Circuit 736 is broken due to the fact that the contacts 738 are open and while contacts 742 and 742a in circuit 740 are both closed, they are serially arranged in the circuit and the circuit is broken at a point between these sets of contacts by the open contacts 744. Open position of the contacts 738 to de-energize circuit 736 is insured by the fact that the solenoid coil 798 is energized, since through the closed contacts 742a the solenoid coil is in communication with the source of electric energy through a part of the circuit 740. If under these conditions the throttle pedal is permitted to move to position 612, contacts 744 are closed to energize circuit 740 and move the control valve to neutral position.

If now the vehicle is moved by opening the throttle, the centrifugal weights 515 move outwardly from their inner position 516 to position 518, this movement being permitted without necessity for compressing spring 529, because of clearance between the plunger 480c and the cam 778. Position 518 of the weights corresponds to the upper limit of the low speed range of vehicle speed, which has been assumed to be 12 miles per hour. This range of movement results in contacts 742 and 742a being opened but is insufficient to move the collar 480b on the spindle 480 far enough to the right from the position shown to throw the overcenter switch to the position closing contacts 738, and as long as these contacts remain open direct drive is impossible. When the weights move out to a position where further outward movement requires compression of spring 529, the movement is arrested by this precompressed spring (assuming full throttle position of cam 778) plus the resistance of spring 527 until the lower limit of the high speed range of vehicle is reached which has been assumed to be 60 miles per hour. When that speed is reached or exceeded the weights then move from position 518 to position 520 and such movement causes the overcenter switch to be shifted to the position closing contacts 738. This energizes circuit 736 to effect direct drive. If under this condition the operator attempts to kick-down to hydraulic drive the closing of contacts 746 is ineffective, for the reason that while the closing of these contacts energizes the solenoid coil 798 to tend to make the solenoid throw the overcenter switch to hydraulic position in which the contacts 738 are opened to break circuit 736, this is prevented mechanically due to the position of the collar 480b on the spindle 480, the solenoid not being strong enough to shift the spindle 480 against the resistance of the centrifugal weights.

If on the other hand the car speed is in the intermediate speed range, weights 515 are in their intermediate position 518 and the spindle 480 is in a position such that the collar 480b is far enough to the left to permit the solenoid to shift the overcenter switch as contacts 746 are closed by a kick-down operation.

As previously noted, the weights 515 remain in position 518 until the 60 miles per hour speed is reached under full throttle conditions, since under full throttle conditions the cam 778 is in a position such as to cause spring 529 to require the maximum force to compress it and permit the weights to move to the position 520. At partial throttle positions, the weights will move from position 518 to position 520 at different intermediate car speeds, dependent upon momentary throttle position determining the momentary position of cam 778.

Consequently, if the car is in intermediate speed range in hydraulic drive and it is desired to shift to direct drive, release of the throttle pedal moves the cam 778 to decrease the resistance of spring 529 so as to permit the spindle 480 to move to the right sufficiently to cause the collar 480b to shift the overcenter switch to the direct drive position.

Thus the same vehicle operating functions are obtained with the present arrangement as with those previously described. It will be evident however, that in the present arrangement the control function is primarily dependent upon the centrifugal governor and the connection between the throttle pedal and the cam which acts to modify the action of the governor spring 529 and the arrangement not only requires a relatively very accurate governor but further requires relatively sensitive adjustment as between the governor and the cam. On the other hand the action of the ratio regulator is much more positive and responsive to forces of greater magnitude so as to be not so sensitive to minor adjustment or minor changes in the values of the forces applied due to changes in viscosity of lubricant and other factors arising in service. In other words, while the present arrangement is effective, it is also more delicate and subject to derangement by minor factors affecting its adjustment.

Figure 16:
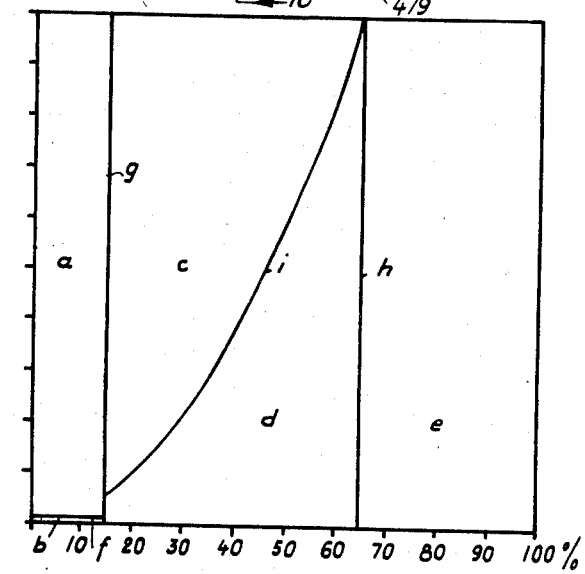
Fig. 16 is a diagram illustrative of the vehicle control obtainable with the control systems shown in Figs. 15 and 15a and 15b.

In order to more clearly show the nature of the control obtainable with any of the control systems shown in Figs. 15, 15a, and 15b the diagram of Fig. 16 is given, in which vehicle speed is plotted against throttle opening or equivalent fuel supply indicative of engine speed and power. Referring now to this diagram, the area *a* represents the combinations of vehicle speed and throttle opening in which hydraulic drive is arbitrarily provided by the control system and the area *b* the combination in which neutral is arbitrarily provided by virtue of the standing condition or very low speed operation of the vehicle and the fully closed or idling position of the throttle. Area *c* represents the combinations of vehicle speed and throttle opening in which either hydraulic or direct drive is obtainable at the will of the operator. Area *d* represents the combinations of vehicle speed and throttle opening in which direct drive is obtained but from which shift to hydraulic drive may be made at the will of the operator, and area *e* represents the range of vehicle speed wherein direct drive is arbitrarily established and maintained by the control system regardless of the will of the operator.

As will be seen from the diagram, areas *a* and *b* are separated by the line *f*, this dividing line being established by movement of the overrule valve 472 in the control system shown in Fig. 15, or the equivalent electrical circuits in the diagrams 15a and 15b, to a position or condition corresponding to position 612 of the throttle pedal.

Areas *a* and *c* are separated by line *g*, which in the several control systems under discussion corresponds to position 518 of the centrifugal weights 515. Areas *d* and *e* are separated by line *h* which represents the condition in the control systems when the centrifugal weights 515 move to their outer position 520.

The line *i* separating areas *c* and *d* represents the combinations of vehicle speed in its intermediate speed range and throttle opening, where, if the vehicle is operating within the speed range covered by area *c* and is operating in hydraulic drive with a throttle opening greater than that corresponding to a position of line *i* at the then given vehicle speed, shift to direct drive may be accomplished by closing the throttle until the throttle opening drops at the given vehicle speed to a value intersecting the line *i*, whereupon shift will be made to direct drive. After this occurs the throttle may again be opened so as to place the vehicle in direct drive with a combination of vehicle speed and throttle opening lying within the confines of area *c*. With the vehicle operating in the speed range covered by area *d* and with a throttle opening at a value less than that corresponding to line *i* at the given vehicle speed, which might for example represent a condition of medium speed operation on a level road or slight down-grade in direct drive, shift to hydraulic drive is obtained by opening the throttle by the kick-down operation to place the combination of vehicle speed and throttle opening within the area *c*.

As will be apparent from the foregoing, the invention in its several aspects may be carried into effect by means of numerous specific designs and constructions and may embody different combinations of features some of which may be employed to the exclusion of others. It is accordingly to be understood that the invention is not limited to the embodiments herein disclosed by way of example but is to be considered as embracing all forms and combinations of apparatus falling within the scope of the appended claims.

What I claim is:

1. A transmission for transmitting power from a driving member to a driven member comprising a hydrodynamic torque converter having a rotatably mounted casing connected to the driving member, said casing providing a working chamber for the hydrodynamic circuit and carrying impeller blades located in the circuit, said driven member comprising turbine blades in said circuit, a rotatably mounted reaction member having reaction blades located in said circuit, a brake for holding said reaction member rotationally stationary against rotation in either direction and being releasable to permit rotation of said reaction member in either direction, means including a clutch providing an alternative power transmitting connection between said driving and driven members and a control system utilizing pressure fluid to selectively control the engagement and disengagement of said clutch and said brake in desired relation to effect drive alternatively through said converter or said alternative power transmitting connection.

2. A transmission for transmitting power from a driving member to a driven member comprising a first means including a hydrodynamic torque converter, a second means for alternatively transmitting power between said members and a control system utilizing pressure fluid to control the operation of said means, said system including a main control valve for effecting power transmission alternatively through one or the other of said means, a speed responsive device responsive to the speed of operation of said driven member and influencing the position of said control valve to insure power transmission through said first means whenever said driving member is operating and the speed of said driven member is below a first predetermined value and for insuring power transmission through said second means whenever the speed of said driven member is above a second predetermined value higher than said first value and a regulating device influencing the position of said control valve and operable only when the speed of said driven member is within the range between said predetermined values to change the path of power transmission from said first means to said second means.

3. A transmission as set forth in claim 2 in which said regulating device is responsive to the speeds of said driving and driven members to automatically effect said change when the speed of the driven member relative to that of the driving member exceeds a predetermined value.

4. A transmission as set forth in claim 3 in which said control system includes manually operable means for selectively overruling said regulating device to change the path of power transmission from said second means to said first means.

5. A transmission for transmitting power from a driving member to a driven member comprising a hydrodynamic torque converter, means providing an alternative drive between said members, and a control system utilizing pressure fluid to control operation of the transmission, said system including a main control valve movable to different positions to determine either converter drive or said alternative drive, automatic regulating means including a valve movable in response to an impulse indicative of predetermined torque transmitting conditions through said converter for causing said control valve to effect said alternative drive and manually operable means for selectively overruling said regulating means to cause said control valve to effect hydraulic drive.

6. A transmission as set forth in claim 5 in which said manually operable means is operatively associated with a power control element for controlling the power input to the transmission to overrule said regulating means when said power control element is moved past the position corresponding to full power input to the transmission.

7. A transmission as set forth in claim 6 in which said manually operable means comprises an overrule valve operatively interposed between said control valve and said regulating means.

8. A transmission as set forth in claim 6 in which electrically energized actuating means is provided for moving said control valve to hydraulic drive position and said manually operable means is operative to selectively energize said actuating means.

9. A transmission for transmitting power from a driving member to a driven member comprising a first means including a hydrodynamic torque converter, a second means for alternatively transmitting power between said members, and differential speed responsive control means responsive to a predetermined value of the speed ratio between said members produced by said first means for shifting the path of power transmission from said first means to said second means.

10. A transmission for transmitting power from a driving member to a driven member comprising a first means including a hydrodynamic torque converter, a second means for alternatively transmitting power between said members, differential speed responsive control means responsive to a predetermined value of the speed ratio between said members produced by said first means for automatically shifting the path of power transmission from said first means to said second means, and manually operable control means for selectively shifting the path of power transmission from said first means to said second means.

11. A transmission for transmitting power from a driving member to a driven member comprising a first means including a hydrodynamic torque converter, a second means for alternatively transmitting power between said members, and a control system for governing the operation of said first means and said second means, said system including a speed responsive device responsive to the speed of operation of said driven member for normally rendering said second means inoperative and said first means operative when the speed of the driven member is below a predetermined minimum value, a device responsive to an impulse indicative of a predetermined value of the speed ratio between said members produced by said first means for automatically shifting the path of power transmission from said first means to said second means and manually operable means for selectively utilizing said first means or said second means to transmit power.

12. A transmission for transmitting power from a driving member to a driven member comprising a first means including a hydrodynamic circuit having pump blading, turbine blading and reaction blading in the circuit, a second means for alternatively transmitting power between said members, control means responsive to a predetermined value of the speed of said driven member for automatically shifting the path of power transmission from said second means to said first means, and manually operable control means for effecting the release of said reaction blading so as to rotate freely when the speed of said driven member is below said predetermined value.

13. A transmission for transmitting power from a driving member to a driven member comprising a first means including a hydrodynamic circuit having pump blading, turbine blading and reaction blading in the circuit, a second means for alternatively transmitting power between said members, and a control system for governing the operation of said first means and said second means, said system including a speed responsive device indicative of the speed of operation of said driven member for normally rendering said second means inoperative and said first means operative when the speed of the driven member is below a predetermined minimum value, a device responsive to a predetermined value of the speed ratio between said driven and said driving member for automatically shifting the path of power transmission from said first means to said second means and manually operable means for selectively rendering said first means or said second means operative to transmit power.

14. In a vehicle drive for transmitting power from an engine to a vehicle driving element, a transmission comprising a hydrodynamic torque converter having a primary member, a reaction member and a secondary member, said members being rotatably mounted, a brake for holding said reaction member rotationally stationary, gearing interposed between said secondary member and said vehicle driving element for effecting different drives therebetween, said gearing including a neutral position in which the path of power transmission from said secondary member to said element is interrupted, a control mechanism for selectively establishing said neutral position or a selected one of said drives, and means for automatically insuring release of said brake to permit said reaction member to rotate freely whenever said control mechanism is set to establish said neutral position.

15. A drive as set forth in claim 14 in which said gearing provides forward and reverse drives between said secondary member and said vehicle driving element.

16. A drive as set forth in claim 14 in which said gearing includes positively engaging elements shiftable from disengaged to engaged position to effect any one of said drives and said control mechanism includes means for moving selected ones of the last mentioned elements into driving engagement before said brake can be engaged.

17. A drive as set forth in claim 14 including a pressure fluid actuated control system having a main control valve for determining engagement or release of said brake and in which said control mechanism comprises a manually operable member operatively associated with said control valve for positively positioning the valve in neutral position.

18. In a power transmission comprising a hydrodynamic torque converter and an alternative drive for transmitting power from a driving member to a driven member, a regulator comprising a control member movable from a first position to a second position and vice versa to provide in alternation converter drive or said alternative drive between said members, a first element rotatable at a speed indicative of the speed of the driving member, a second element rotatable at a speed indicative of the speed of the driven member, and means operatively connecting both of said elements with said control member for causing said control member to move from one to the other of said positions when the speeds of said elements cross.

19. Apparatus as set forth in claim 18 comprising a turnably mounted control member and a friction force transmitting connection between the control member and one of said rotatable elements.

20. Apparatus as set forth in claim 18 comprising a regulator for controlling flow of pressure fluid including a valve member movable between said positions to effect the desired control.

21. Apparatus as set forth in claim 18 including a speed responsive device responsive to the speed of said driven member for rendering said control member ineffective to establish said alternative drive when the speed of the driven member is below a predetermined value.

22. A transmisison comprising a hydrodynamic hydraulic torque converted having a working chamber for transmitting power from a driving member to a driven member, means providing an alternative driving connection between said members including a fluid pressure actuated clutch having a pressure chamber, means for supplying fluid under pressure, means for selectively controlling flow of said fluid to said chamber and to said clutch including control valve means, a first conduit means providing a connection between said valve means and said clutch chamber and a second conduit means providing a connection between said valve means and said working chamber, means providing a restricted connection between said first and said second conduit means operative to produce a substantial pressure drop of fluid flowing through said connection, said control valve being operative in a first position to supply pressure fluid through said first conduit means to said pressure chamber and to cause the return of pressure fluid through said connection at reduced pressure through said second conduit means, whereby to apply hydraulic engaging force to said clutch and maintain the fluid in said working chamber at reduced pressure and said valve being operative in a second position to supply pressure fluid through said second conduit means and to cause the return of fluid through said connecion and said first conduit means at reduced pressure, whereby to effect release of said clutch and maintain the pressure of the fluid in said working chamber at relatively higher pressure.

23. A transmission as set forth in claim 22 including means associated with said control valve for maintaining a predetermined minimum pressure in said second conduit means when the control valve is in said first position.

24. A transmission comprising a hydrodynamic torque converter for transmitting power from a driving member to a driven member, means including a fluid pressure actuated clutch providing an alternative drive between said members, a control system utilizing pressure fluid for maintaining working pressure in said converter and for actuating said clutch including a control valve movable to selectively establish converter drive or said alternative drive, electrically energized means for operating said valve, a governing device responsive to the ratio of the speeds of said driving and driven member for controlling said electrically energized means to determine the position of said control valve under predetermined conditions and a speed responsive device responsive to the speed of said driven member for modifying the action of said governing device.

25. A transmission comprising a hydrodynamic torque converter for transmitting power from a driving member to a driven member including a fluid pressure actuated clutch providing an alternative drive between said members, a control system utilizing pressure fluid for maintaining working pressure in said converter and for actuating said clutch including a control valve movable to selectively establish converter drive or said alternative drive, electrically energized means for operating said valve, a speed responsive device responsive to the speed of operation of said driven member for controlling said electrically energized means to determine the position of said control valve under predetermined conditions and means responsive to variations in the power input to said driving member for modifying the action of said speed responsive device.

26. Apparatus as set forth in claim 25 in which said driving member is engine driven and said last mentioned means comprises a member operatively associated with the element for controlling the fuel supply to the engine.

27. A transmission comprising a hydrodynamic torque converter for transmitting power from a driving member to a driven member, means providing an alternative drive between said members, a control system utilizing pressure fluid and including a control valve for selectively establishing either converter drive or said alternative drive, a regulator responsive to the ratio of the speeds of said driving and said driven members for governing said control valve to provide one or the other of said drives under predetermined conditions and a speed responsive device responsive to the speed of said driven member for modifying the influence of said regulator, said speed responsive device comprising a centrifugal governor constructed and arranged to move within a first range of movement insuring converter drive when the speed of said driven member is below a predetermined minimum value, to move to a second position permitting either converter drive or said alternative drive to be established by said regulator when said minimum value is exceeded and remains below a second predetermined value higher than said minimum value and to move to a third position insuring said alternative drive whenever the speed of the driven member exceeds said second predetermined value.

28. A transmission for transmitting powr from an engine to a vehicle drive shaft comprising a first power transmitting means including a hydraulic torque converter for transmitting power from the engine to a driven member of the transmission, a second power transmitting means including a releasable clutch for alternatively transmitting power mechanically from the engine to said driven member, a power output member adapted to be connected to the vehicle drive shaft, gearing between said driven member and said power output member for providing a positively engaging forward drive connection, a reverse drive connection and a neutral between said members, a control system including fluid pressure actuated means for actuating said clutch and spring means for holding said clutch in engaged position in the absence of fluid pressure, the strength of said spring means being insufficient to prevent disengagement of said clutch by said fluid pressure in the normal operation of said control system.

29. A transmission as set forth in claim 28 in which said control system includes a manually actuated control for said gearing to effect engagement of said positive forward drive connection.

30. A transmission as set forth in claim 28 including fluid pressure actuated synchronizing means constituting a part of said control system for synchronizing said gearing to facilitate engagement of said positive forward drive connection.

31. In a power transmission for a vehicle having an engine and brakes, a hydrodynamic torque converter for transmitting power from the engine to drive the vehicle, reverse gear mechanism providing a forward drive, a reverse drive and a neutral, means for rendering said torque converter ineffective to transmit power, a fluid pressure actuated control system including a source of pressure fluid and a valve for controlling said means, said valve having a neutral position for rendering the converter ineffective to transmit power and a hydraulic drive position for rendering the converter operative, a manually operable member for setting said brakes including locking means for maintaining said member in brake setting position, and fluid pressure actuated means controlled by said valve for releasing said locking means, said valve being operative to supply pressure fluid to said pressure actuated means whenever the valve is moved away from said neutral position and pressure fluid from said source is available.

32. Apparatus as defined in claim 31 including a manually operable element for controlling said reverse gear mechanism and means operatively connected with said element for holding said valve in said neutral position whenever said element is in neutral position.

33. In a power transmission comprising a hydrodynamic torque converter and an alternative drive for transmitting power from a source to a driven member, a fluid pressure actuated control system for selectively effecting either of said drives or a neutral in which neither drive is effective, said system comprising a source of pressure fluid, a main control valve having a hydraulic drive position, an alternative drive position and a neutral position, spring means for biasing said valve to hydraulic drive position, a control element for controlling the amount of power input from said source to the transmission, and an auxiliary valve operatively connected with said control element for supplying pressure fluid to said main valve to oppose said spring means and maintain said main valve in said neutral position when said control element is positioned for idling operation of said source of power.

34. A transmission as defined in claim 33 including a reverse gear mechanism providing a forward drive, a reverse drive and a neutral between said driven member and an external load member, a control member movable to different positions to selectively effect forward drive, reverse drive or neutral to said load member, and means actuated by movement of said control member for positively maintaining said main valve in neutral position whenever said control member is in neutral position.

35. A transmission comprising a hydrodynamic torque converter having a working chamber for transmitting power from a driving member to a driven member, means providing an alternative driving connection between said members including a friction clutch located in a clutch chamber, a fluid pressure actuated member exposed on one side to pressure in said clutch chamber and on the other side to pressure in a pressure chamber for engaging said clutch, a fluid pressure control system including control valve means for controlling flow of pressure fluid to and from said chambers, said valve means being movable to different positions in a first of which positions pressure fluid is admitted to said pressure chamber and said working chamber and said clutch chamber are vented and in a second of which positions pressure fluid is vented from said pressure chamber and admitted to said working chamber and to said clutch chamber.

36. Apparatus as defined in claim 35 including a conduit for supplying pressure fluid to said pressure chamber, means providing a restricted communication between said conduit and said working chamber, and pressure responsive means for regulating the flow of fluid vented from said working chamber, whereby to maintain a predetermined minimum pressure in said working chamber when said valve means is in said second position.

37. Apparatus as defined in claim 35 in which said working chamber and said clutch chamber are in open communication to maintain a common pressure therein.

38. Apparatus as defined in claim 35 including spring means acting continuously on said fluid pressure actuated member to engage the clutch, the strength of said spring means being such as to be overcome and the clutch disengaged when said valve means is in said second position to vent said pressure chamber and admit pressure fluid to said clutch chamber.

39. A power transmission comprising a variable speed hydraulic torque converter having a working chamber for transmitting power from a driving member to a driven member, means providing a mechanical driving connection between said members including a fluid pressure actuated clutch having a pressure chamber, means for supplying fluid under pressure, means for selectively controlling flow of said fluid to said chamber and to said clutch including control valve means, a first conduit means providing a connection between said valve means and said clutch chamber and a second conduit means providing a connection between said valve means and said working chamber, means providing a restricted connection between said first and said second conduit means operative to produce a substantial pressure drop of fluid flowing through said connection, said control valve being operative in one position to supply pressure fluid through said first conduit means to engage said clutch and to cause the return of pressure fluid through said connection at reduced pressure through said second conduit means, whereby to engage said clutch and maintain the fluid in said working chamber at reduced pressure and said valve being operative in a second position to supply pressure fluid through said second conduit means and to cause the return of fluid through said connection and said first conduit means at reduced pressure, whereby to effect release of said clutch and maintain the pressure of the fluid in said working chamber at relatively higher pressure.

40. A power transmission for transmitting power from a power input member turning in one direction to a power output member turning alternatively in either the same or reverse direction comprising a variable speed hydraulic torque converter having a driving member and a driven member, means including a fluid pressure actuated clutch for establishing a direct driving connection between said driving and driven members, gearing selectively operable to provide forward and reverse driving connections between said driven member and said power output member, shift means for selectively shifting said gearing to provide either forward or reverse drive of said power output member, a fluid pressure actuated synchronizing clutch for synchronizing the speeds of said driven and output members prior to engagement of said gearing for either forward or reverse drive, a source of operating fluid under pressure for said clutches, valve means for controlling flow of operating fluid from said source to said clutches to engage the same, said valve means including a master valve for controlling flow of pressure fluid to and from said driving clutch to engage or release the same and one or more control valves for admitting pressure fluid to and releasing pressure fluid from said synchronizing clutch, and means operatively associated with said shift means and said master valve for shifting the latter to a position providing disengagement of the driving clutch upon movement of the shift means to engage said gearing for reverse drive of said power output member.

41. The combination, with a transmission providing a variable speed hydraulic torque converting drive and an alternatively operable drive, of a control system for controlling said drives including a control member movable between a first position determining hydraulic drive and a second position determining said alternative drive, torque responsive means responsive to variations in the value of reaction torque developed by said hydraulic drive for automatically shifting said control member from said first to said second positions under predetermined reaction torque conditions, an overrule mechanism operable independently of said torque responsive means for shifting said control member from either one of said positions to the other, and a yieldable connection between said overrule mechanism and said control member for rendering said overrule mechanism ineffective to shift said control member to said second position against the action of said torque responsive means when the reaction torque acting on the latter exceeds a predetermined value.

42. The combination, with a transmission providing a variable speed hydraulic torque converting drive, an alternatively operable drive and reversing mechanism movable to a position providing reverse drive of the power output element of the transmission, of a control system for controlling said drives including a control member movable between a first position determining hydraulic drive and a second position determining said alternative drive, torque responsive means responsive to variations in the value of reaction torque developed by said hydraulic drive for automatically shifting said control member from said first to said second position under predetermined reaction torque conditions, an overrule mechanism operable independently of said torque responsive means for shifting said control member for either one of said positions to the other, and interlocking means controlled by said mechanism for holding said control mmeber in said first position and rendering both said torque responsive means and said overrule mechanism ineffective to move said control element to said second position whenever the reversing mechanism is positioned to provide reverse drive.

43. The combination, with a transmission providing a variable speed hydraulic torque converting drive and an alternatively operable drive of a fluid pressure control system for controlling said drives including a control valve for controlling flow of pressure fluid in said system and movable between a first position determining hydraulic drive and a second position determining said alternative drive, torque responsive means responsive to variations in the value of reaction torque developed by said hydraulic drive for automatically shifting said control valve from said first to said second position under predetermined reaction torque conditions, said torque responsive means including spring means for shifting said valve to said second position in opposition to the force developed by reaction torque, whereby to determine the position of the valve in accordance with the relation of the value of the reaction torque to the strength of said spring means, and an overrule mechanism operable independently of said torque responsive means for shifting said control member from either one of said positions to the other.

44. The combination, with a transmission providing a variable speed hydraulic torque converting drive and an alternatively operable drive, of a fluid pressure control system for controlling said drives including a control valve for controlling flow of pressure fluid in said system and movable between a first position determining hydraulic drive and a second position determining said alternative drive, torque responsive means responsive to variations in the value of reaction torque developed by said hydraulic drive for automatically shifting said control valve from said first to said second position under predetermined reaction torque conditions, said torque responsive means including adjustable spring means for shifting said valve to said second position in opposition to the force developed by reaction torque, whereby to vary the spring force required to be overcome by reaction torque to shift the valve from said second position to said first position, and an overrule mechanism operable independently of said torque responsive means for shifting said control member from either one of said positions to the other.

45. In a power transmission comprising a hydrodynamic torque converter for transmitting power from a driving member to a driven member, a fluid pressure actuated control system including a control valve movable to different positions for controlling flow of pressure fluid to provide in alternation different driving relations between said members, said control valve being turnably mounted and axially shiftable between said positions, a first element rotatable at a speed indicative of the speed of the driving member, a second element rotatable at a speed indicative of the speed of the driven member, a connection between said control valve and one of said elements for effective shifting of the valve between said positions by limited relative turning movement between the parts and a friction driving connection between said control valve and the other of said elements for effecting said limited relative turning movement when the speeds of said elements cross.

46. A transmission for transmitting powr from a driving member to a driven member comprising a hydrodynamic torque converter having a rotatably mounted casing connected to the driving member, said casing providing a working chamber for the hydrodynamic circuit and carrying impeller blades located in the circuit, said driven member comprising turbine blades located in said circuit, a rotatably mounted reaction member having reaction blades located in said circuit, a brake for holding said reaction member rotationally stationary against rotation in either direction and being releasable to permit rotation of said reaction member in either direction, means including a clutch providing an alternative power transmitting connection between said driving and driven members and a control system utilizing pressure fluid to selectively control the engagement and disengagement of said clutch and said brake in desired relation to effect drive alternatively through said converter or said alternative power transmitting connection, said control system including a main control valve having a converter drive position operative to effect disengagement of said clutch and engagement of said brake and an alternative drive position operative to effective disengagement of said brake and engagement of said clutch.

47. A transmission for transmitting power from a driving member to a driven member comprising a hydrodynamic torque converter of the rotating casing type having a rotatably mounted reaction member and a brake for holding said reaction member rotationally stationary against rotation in either direction, said brake being releasable to permit rotation of said reaction member in either direction, means including a clutch providing an alternative power transmitting connection between said driving and driven members and a control system utilizing pressure fluid to selectively control the engagement and disengagement of said clutch and said brake in desired relation to effect drive alternatively through said converter or said alternative power transmitting connection, said control system including a main control valve having a converter drive position operative to effect disengagement of said clutch and engagement of said brake and an alternative drive position operative to effect disengagement of said brake and engagement of said clutch, and said control system further including a timing valve operative to delay the disengagement of said brake relative to the engagement of said clutch upon movement of said main control valve from said converter drive position to said alternative drive position.

48. A transmission for transmitting power from a driving member to a driven member comprising a hydrodynamic torque converter of the rotating casing type having a rotatably mounted reaction member and a brake for holding said reaction -member rotationally stationary against rotation in either direction, said brake being releasable to permit rotation of said reaction member in either direction, means including a clutch providing an alternative power transmitting connection between said driving and driven members and a control system utilizing pressure fluid to selectively control the engagement and disengagement of said clutch and said brake in desired relation to effect drive alternatively through said converter of said alternative power transmitting connection, said control system including a reaction brake control valve selectively operable to effect engagement of said brake when said main control valve is in said alternative drive position.

49. A transmission for transmitting power from a driving member to a driven member comprising a hydrodynamic torque converter of the rotating casing type having a rotatably mounted reaction member and a brake for holding said reaction member rotationally stationary against rotation in either direction, said brake being releasable to permit rotation of said reaction member in either direction, means including a clutch providing an alternative power transmitting connection between said driving and driven members and a control system utilizing pressure fluid to selectively control the engagement and disengagement of said clutch and said brake in desired relation to effect drive alternatively through said converter or said alternative power transmitting connection, said control system including a main control valve having a converter drive position operative to effect disengagement of said clutch and engagement of said brake, an alternative drive position operative to effect disengagement of said brake and engagement of said clutch, and a neutral position operative to effect disengagement of both of said clutch and said brake.

References Cited in the file of this patent

UNITED STATES PATENTS

| | | |
|---|---|---|
| 1,960,705 | Kochling | May 29, 1934 |
| 2,014,944 | Martyrer et al. | Sept. 17, 1935 |
| 2,045,615 | Rosle et al. | June 30, 1936 |
| 2,277,214 | Dodge | Mar. 24, 1942 |
| 2,332,593 | Nutt et al. | Oct. 26, 1943 |
| 2,351,483 | Carnagua | June 13, 1944 |
| 2,368,684 | Simpson | Feb. 6, 1945 |
| 2,397,634 | Voytech | Apr. 2, 1946 |
| 2,402,164 | Kelbel | June 18, 1946 |
| 2,414,359 | Carnagua et al. | Jan. 14, 1947 |
| 2,442,840 | Carnagua | June 8, 1948 |
| 2,449,608 | Le May | Sept. 21, 1948 |
| 2,466,206 | Carnagua | Apr. 5, 1949 |

FOREIGN PATENTS

| | | |
|---|---|---|
| 330,254 | Italy | Oct. 8, 1935 |